US006937286B2

(12) United States Patent
Takeda

(10) Patent No.: US 6,937,286 B2
(45) Date of Patent: Aug. 30, 2005

(54) VIBRATION PROOF ADAPTER

(75) Inventor: Toshiaki Takeda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 764 days.

(21) Appl. No.: 09/947,369

(22) Filed: Sep. 7, 2001

(65) Prior Publication Data

US 2002/0026696 A1 Mar. 7, 2002

(30) Foreign Application Priority Data

| | | |
|---|---|---|
| Sep. 7, 2000 | (JP) | 2000-272346 |
| Sep. 7, 2000 | (JP) | 2000-272347 |
| Sep. 28, 2000 | (JP) | 2000-295578 |
| Sep. 28, 2000 | (JP) | 2000-296484 |
| Oct. 12, 2000 | (JP) | 2000-311662 |
| Oct. 20, 2000 | (JP) | 2000-320570 |

(51) Int. Cl.[7] ........................ H04N 5/225; H04N 5/228
(52) U.S. Cl. .................................. 348/373; 348/208.99
(58) Field of Search ................................ 348/373, 374, 348/208.99, 208.5, 208.7, 208.11; 359/554; 396/13, 55, 52, 53, 54

(56) References Cited

U.S. PATENT DOCUMENTS

| | | | | |
|---|---|---|---|---|
| 5,194,988 A | * 3/1993 | Flother et al. | 359/554 |
| 5,394,207 A | * 2/1995 | Fujisaki | 396/55 |
| 5,623,326 A | * 4/1997 | Okano | 396/55 |
| 5,644,441 A | * 7/1997 | Hirasaki et al. | 396/531 |
| 5,712,474 A | 1/1998 | Naneda | |
| 5,859,665 A | * 1/1999 | Hibi | 396/55 |
| 5,913,081 A | * 6/1999 | Okano et al. | 396/55 |
| 5,995,761 A | 11/1999 | Wakabayashi et al. | |
| 6,035,134 A | * 3/2000 | Sato et al. | 396/55 |
| 6,738,571 B2 | * 5/2004 | Takeda | 396/55 |
| 6,757,011 B1 | * 6/2004 | Takeda et al. | 348/208.7 |
| 2002/0154223 A1 | * 10/2002 | Moriya | 348/208.11 |

FOREIGN PATENT DOCUMENTS

| | | |
|---|---|---|
| DE | 19914208 A1 | 10/1999 |
| DE | 199 14 208 A1 | 10/1999 |
| JP | 4-369978 | 12/1992 |
| JP | 5-196982 | 8/1993 |
| JP | 6-189181 A | 7/1994 |
| JP | 6-189181 | 7/1994 |
| JP | 11-284900 A | 10/1999 |
| JP | 11-284900 | 10/1999 |

* cited by examiner

*Primary Examiner*—Aung Moe
(74) *Attorney, Agent, or Firm*—Birch, Stewart, Kolasch & Birch, LLP.

(57) ABSTRACT

The vibration proof adapter is arranged between a lens and a camera. Indicators for indicating an ON/OFF status of a vibration proof function are provided on both of the right and left sides of the vibration proof adapter, and the indicators can be checked by a cameraperson with looking at a view finder. Each indicator is retractably provided in a body housing, and a lamp is rotatably provided at the tip of an arm. The arm is made to stand up at the time of image pickup, and is used with turning the screen of the lamp toward the cameraperson. Even if the cameraperson does not move a look from the view finder, the cameraperson can check the lighting status of lamp. Moreover, a cavity for containing the indicator is formed on the periphery of the vibration proof adapter, and the indicator is retracted in the cavity at the time of retraction.

13 Claims, 22 Drawing Sheets

F I G. 1
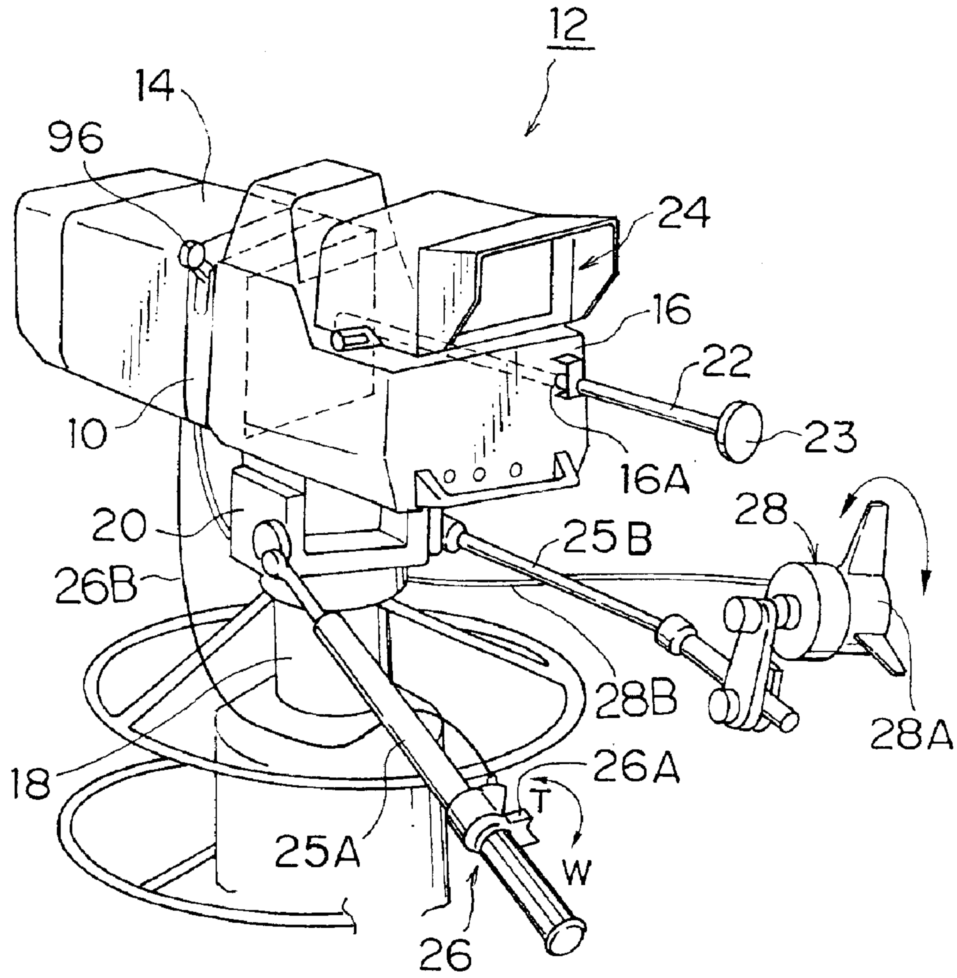

F I G. 3
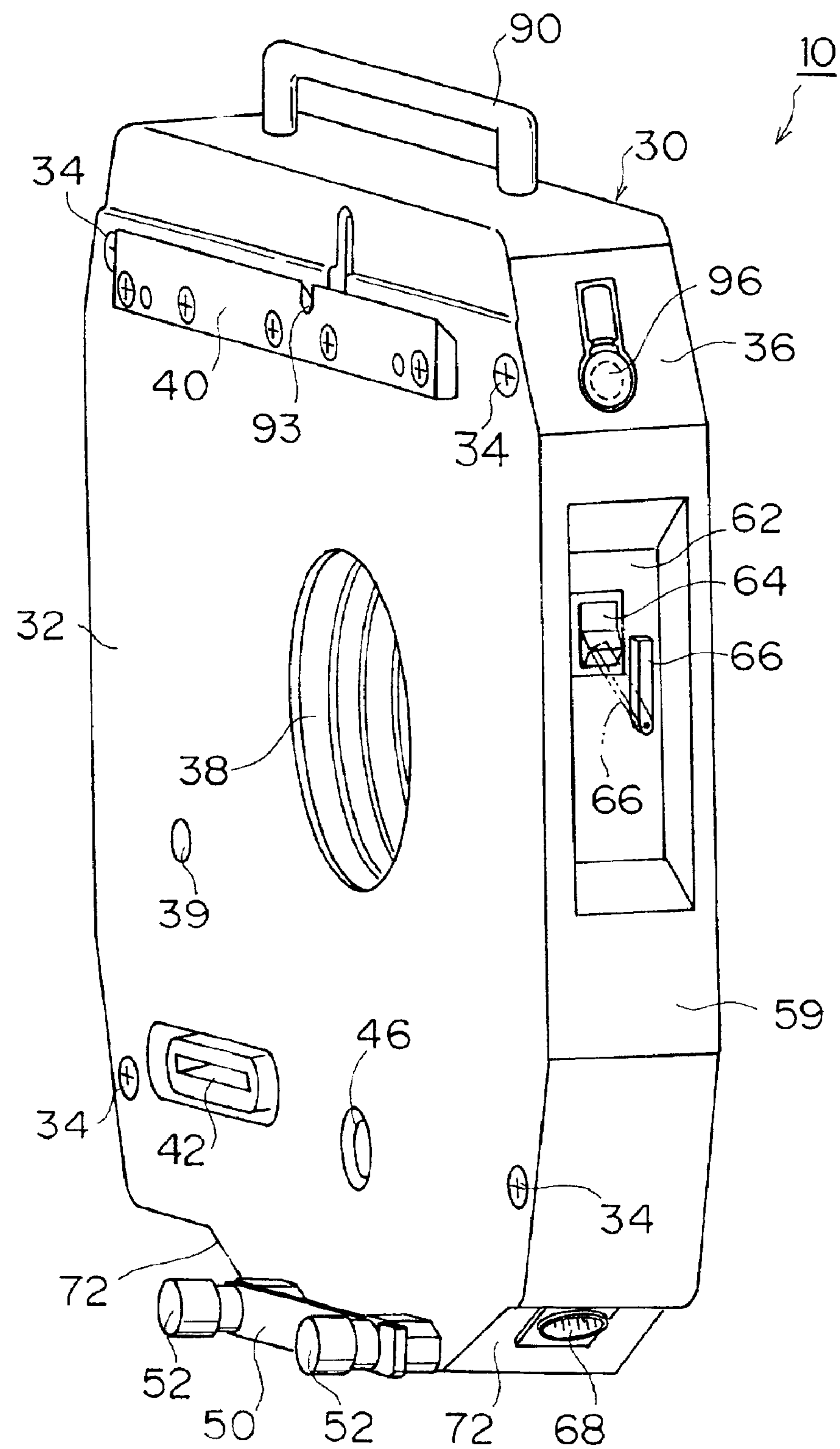

F I G. 4
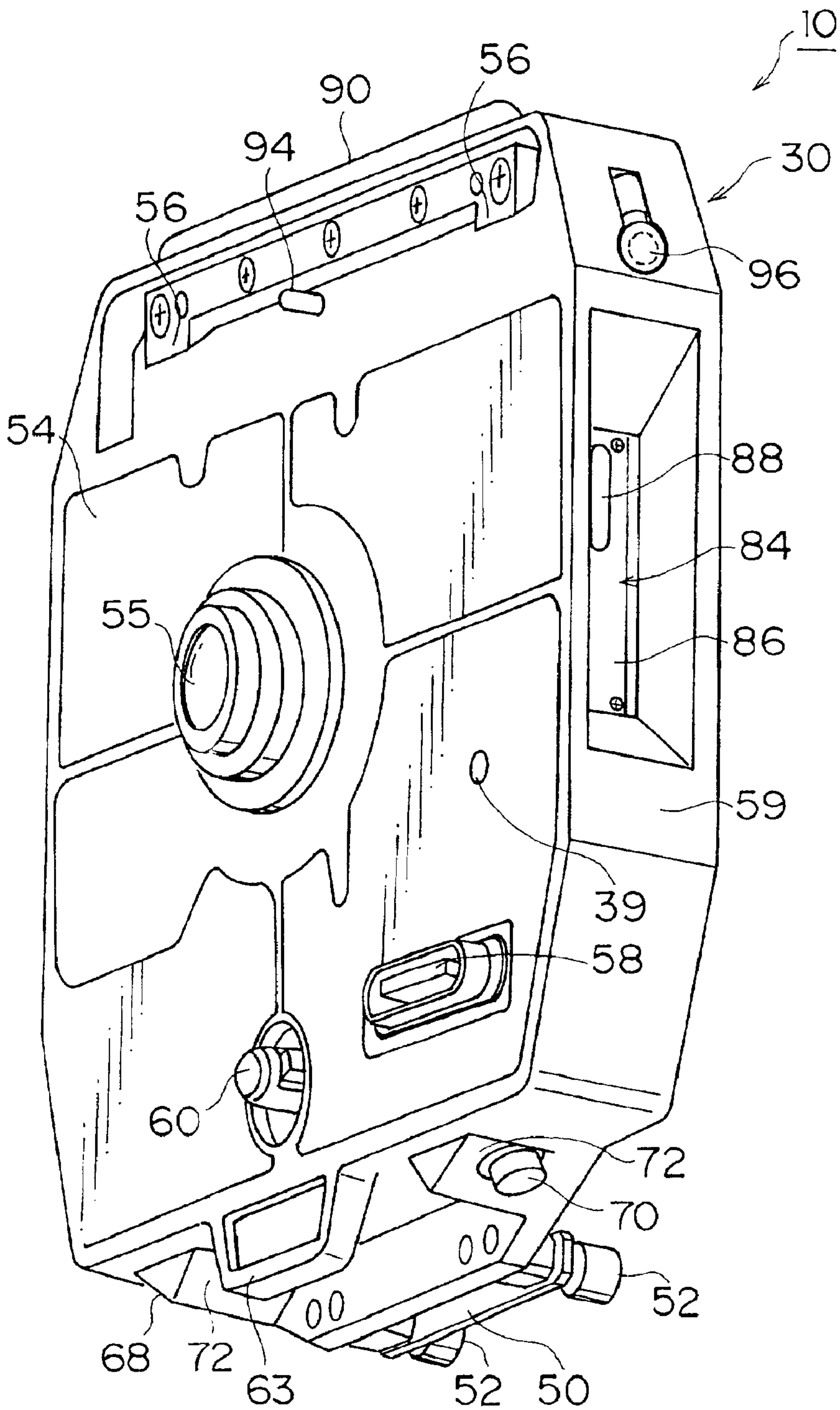

F I G. 5
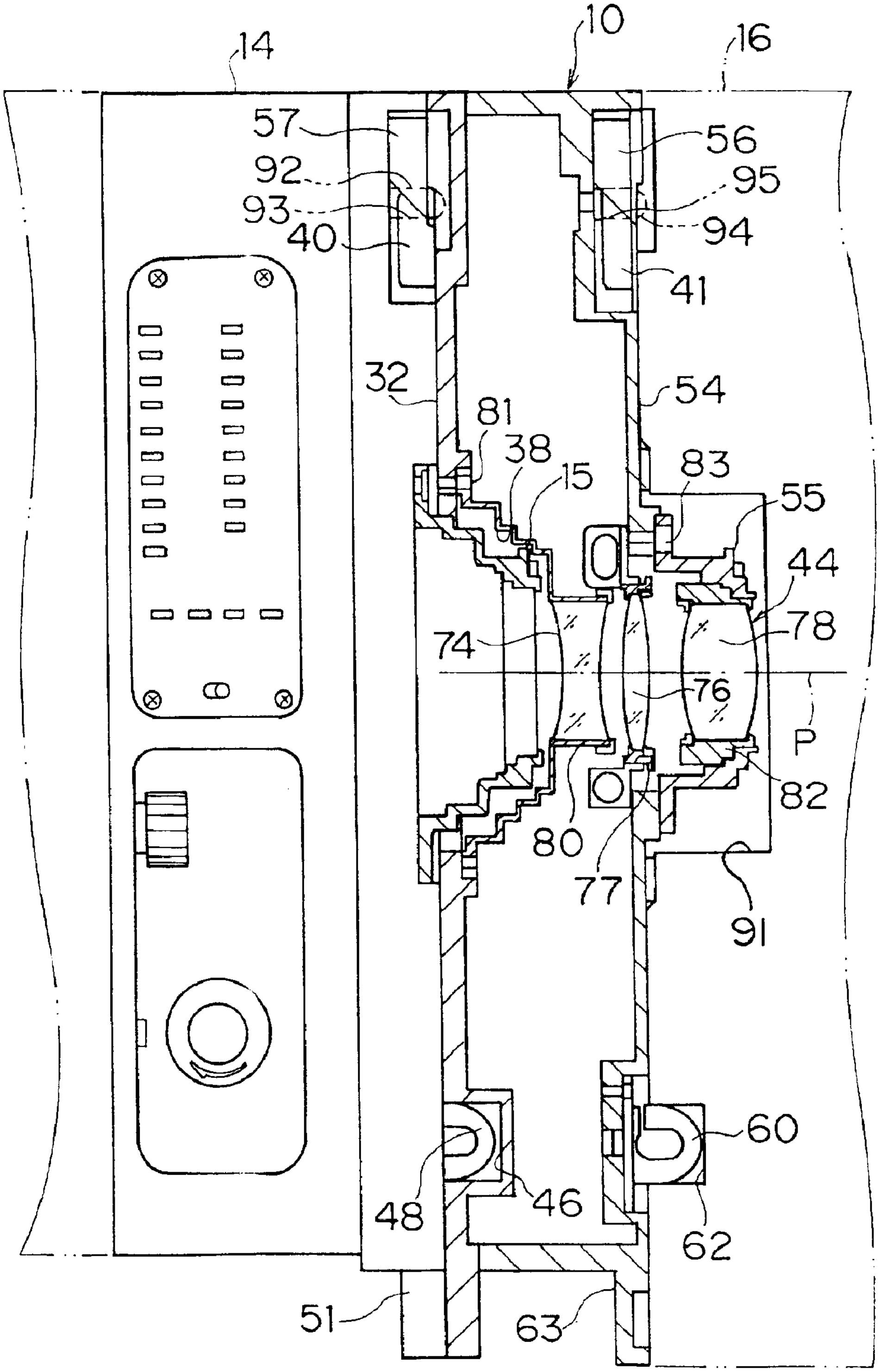

F I G. 6
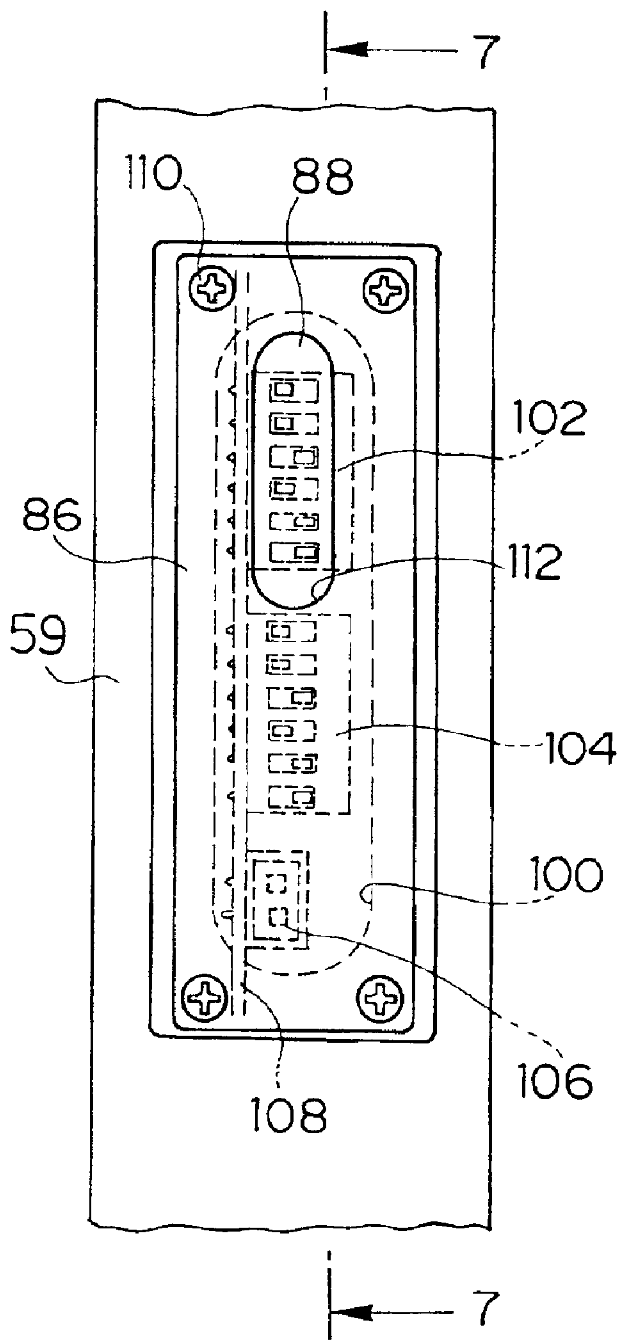

F I G. 8
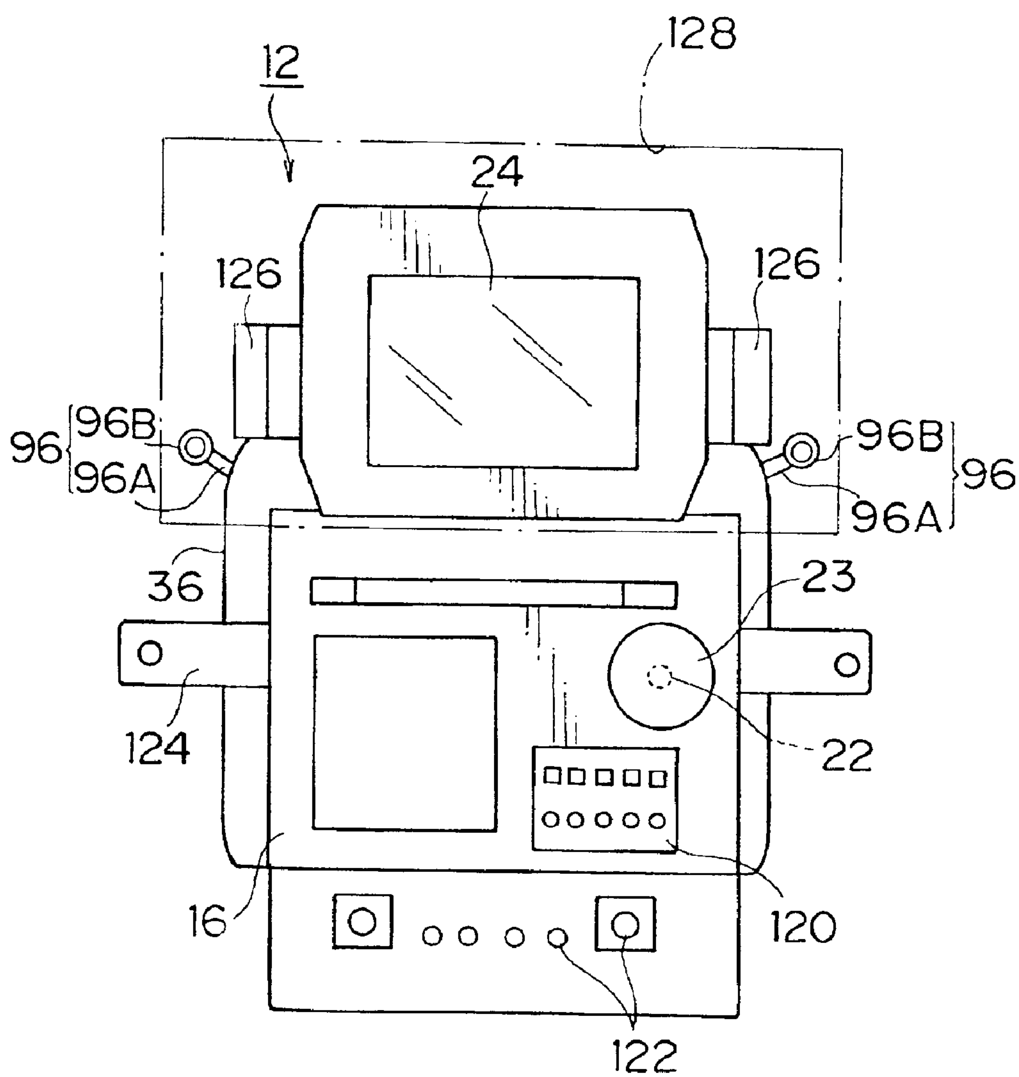

F I G. 9
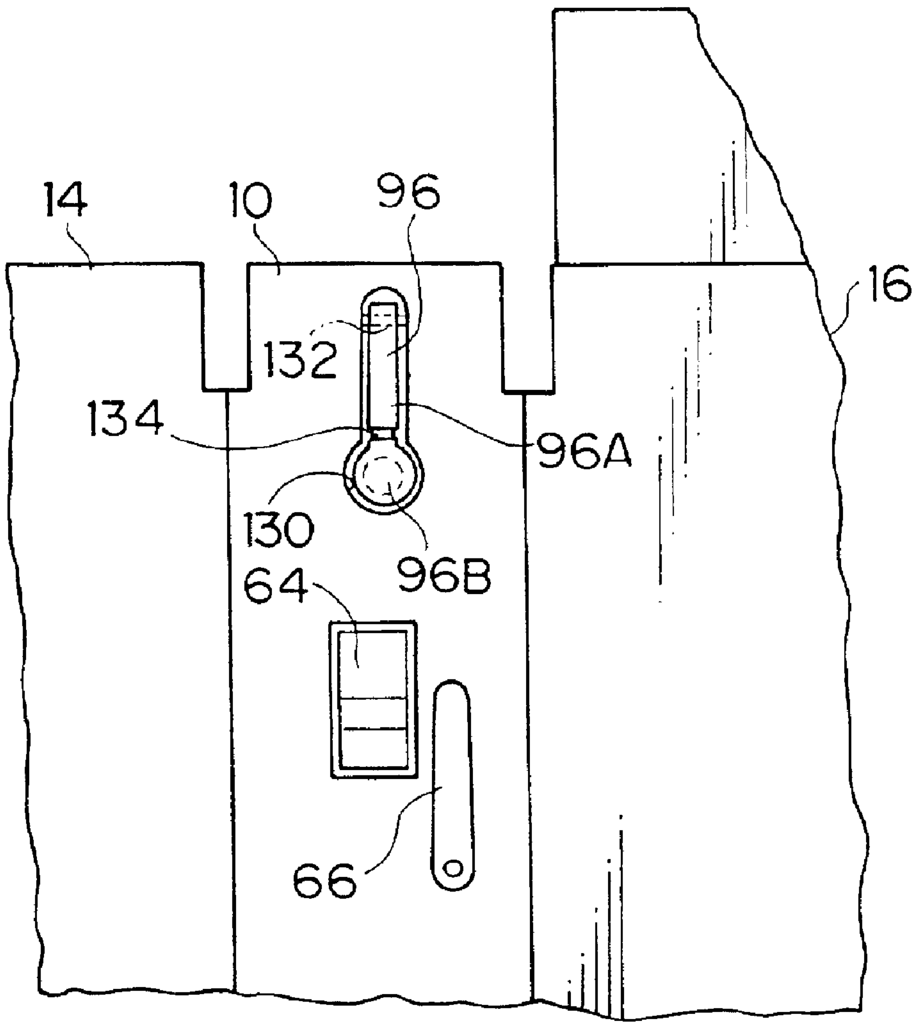

F I G. 1 0
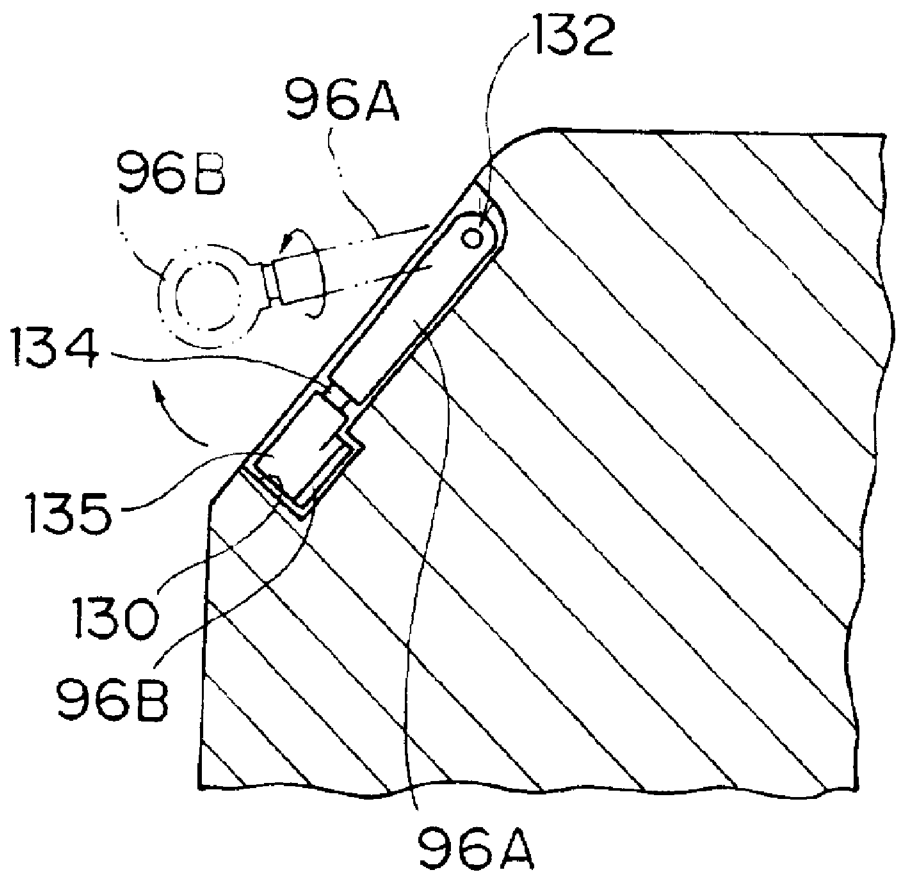

F I G. 1 4
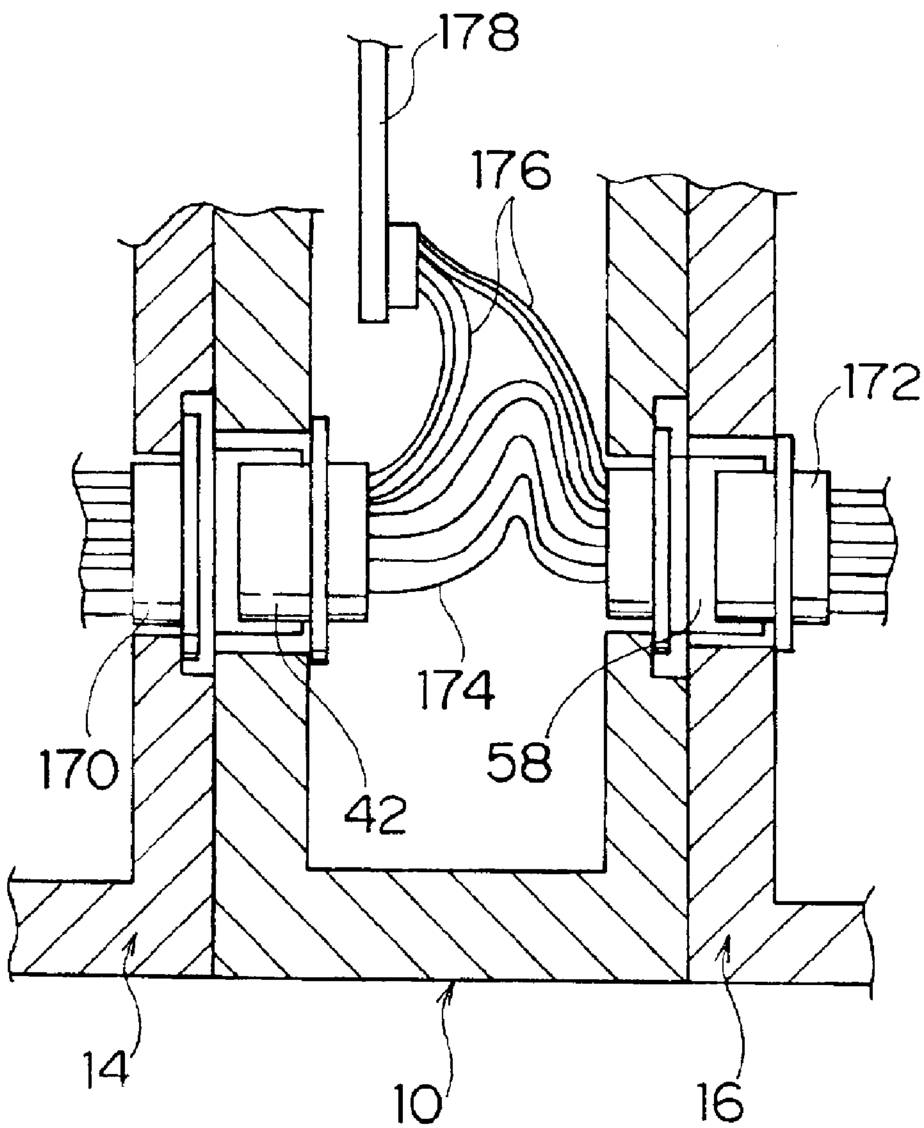

F I G. 1 5
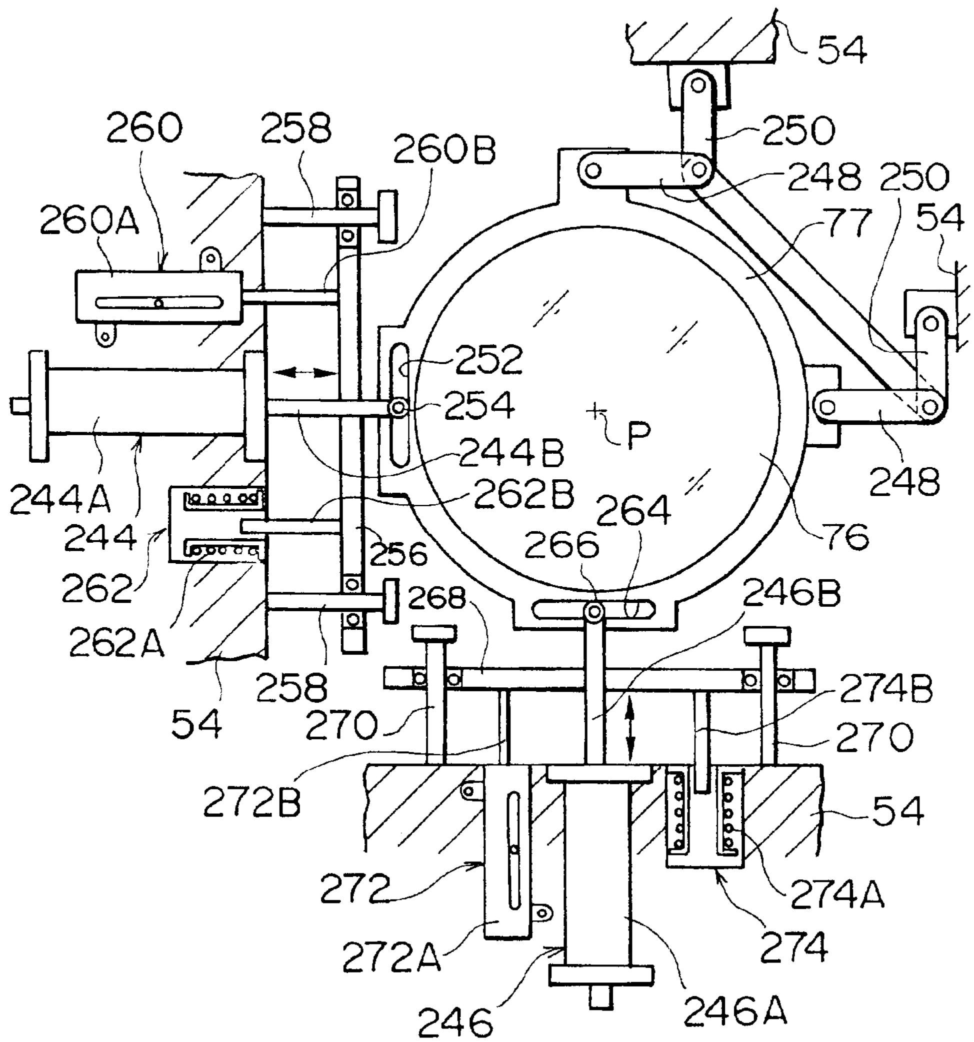

F I G. 1 6
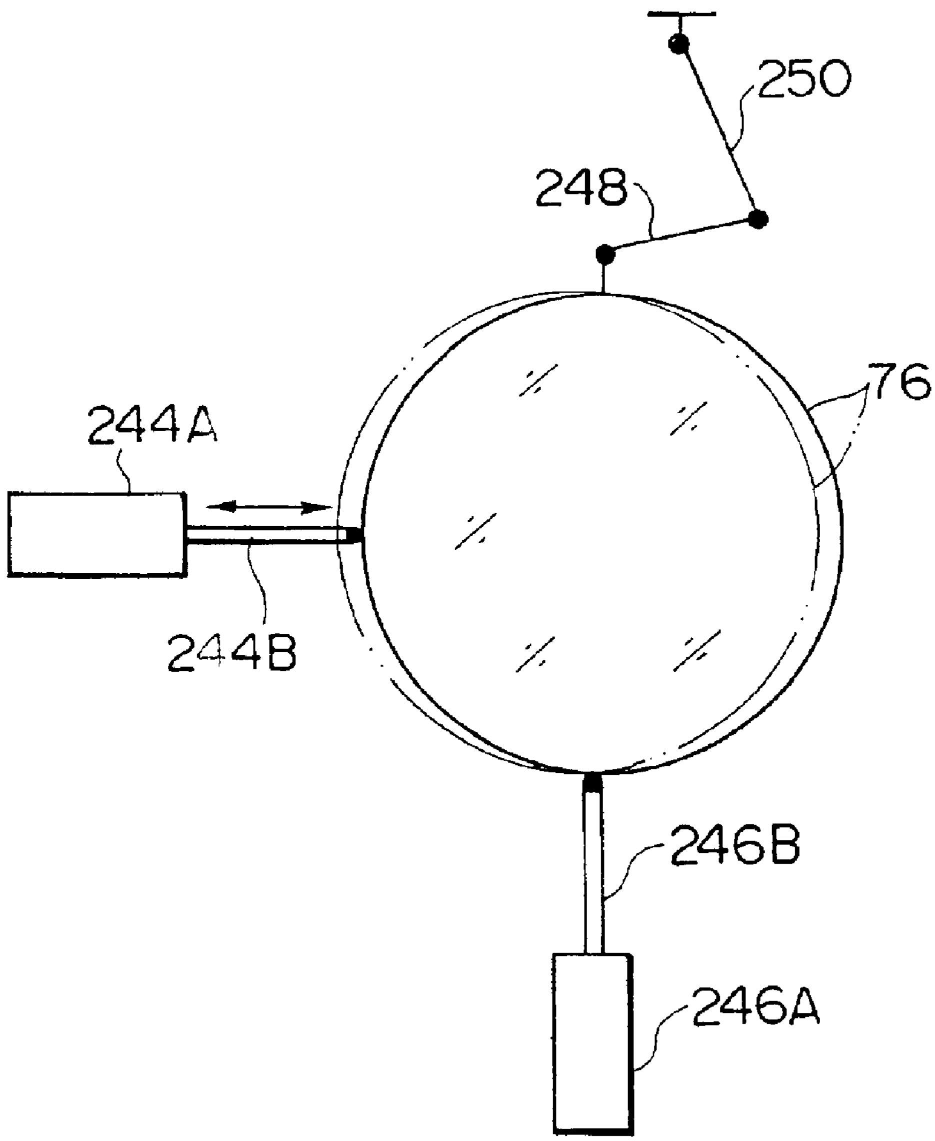

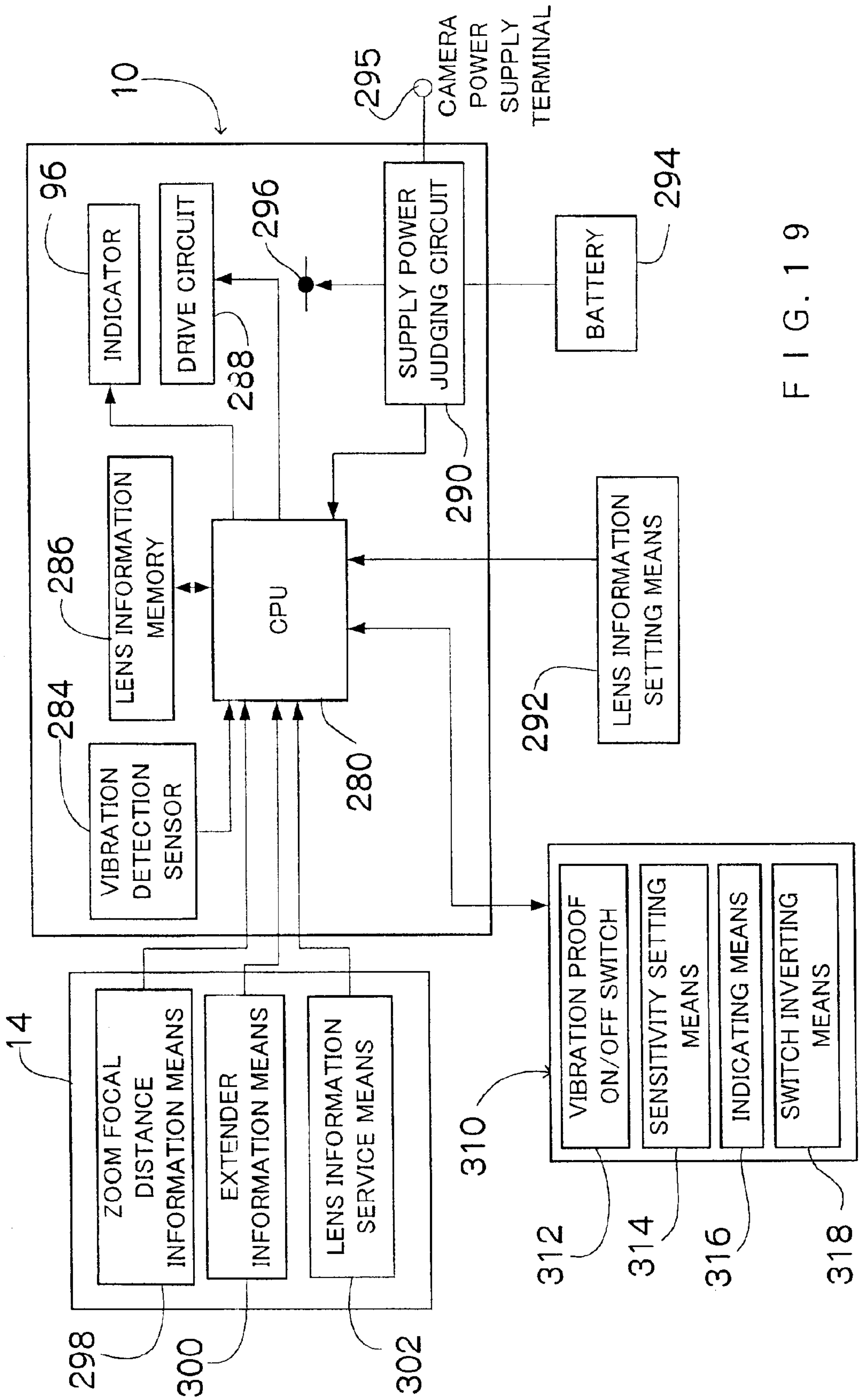
F I G. 1 9

VIBRATION PROOF ADAPTER

BACKGROUND OF THE INVENTION

1. Field of the Invention

The present invention relates to a vibration proof adapter, and in particular, a vibration proof adapter equipped with a vibration proof lens which corrects image blurring produced by the vibration which is added to a camera, when a TV camera is used on an outdoor sport broadcast or unstable footing.

2. Description of Related Art

The intermediate adapter (vibration proof adapter) with which it is detachably equipped between a camera and a lens apparatus is disclosed by Japanese Patent Application Publication No. 6-189181. This vibration proof adapter has an adjustable vertical-angle prism equivalent to a vibration proof lens, a vibration detection sensor, an adjustable vertical-angle prism drive circuit, etc. in the interior. This vibration proof adapter corrects image blurring by decentering an optical axis through moving the adjustable vertical-angle prism with an adjustable vertical-angle prism drive circuit on the basis of vibration information detected by the vibration detection sensor.

On the other hand, Japanese Patent Application Publication No. 11-284900 discloses in FIG. 12 an embodiment where a lens apparatus is connected to a front face of a vibration proof apparatus (vibration proof adopter), and a camera is connected to the rear face of the vibration proof adapter.

However, in Japanese Patent Application Publication Nos. 6-189181 and 11-284900, there is no disclosure about a display function of the vibration proof adapters. In a television camera apparatus equipped with a vibration proof adapter, it is desirable for an image shooter (cameraperson) to be able to easily grasp the camera status whether the vibration proof function is operated or stopped.

In particular, if a cameraperson has means for performing ON/OFF operation or freely switching modes of vibration proof control according to his/her image-taking intention, it is thought that the need that he/she checks the operation situation of a vibration proof function during image pickup.

Moreover, in Japanese Patent Application Publication Nos. 6-189181 and 11-284900, there is no disclosure about the concrete structure of the vibration proof adapters. It is necessary to devise structure in order to realize a detachable vibration proof adapter that can be commonly used in various lens apparatus and camera models and to aim the miniaturization and maintenance of high performance.

Moreover, Japanese Patent Application Publication No. 6-189181 does not disclosure connection structure for connecting the vibration proof adapter to the lens apparatus and camera. Moreover, although the structure for connecting the vibration proof adapter to a lens supporter is disclosed in the Japanese Patent Application Publication No. 11-284900, the structure for directly connecting the vibration proof adapter to the lens apparatus and the structure of a connection of the vibration proof adapter and camera are not disclosed. In order to attain easy detachable work of a detachable vibration proof adapter, which can be commonly used, for various lens apparatuses such as an HD lens, and various camera models, and in order to achieve the simplification of connection structure, and thinning of the adapter, it is necessary to devise the structure of each connection of the lens apparatus and camera.

Moreover, in Japanese Patent Application Publication Nos. 6-189181 and 11-284900, a control unit of each vibration proof adapter is not disclosed. In order to be able to use a vibration proof adapter for various lenses and cameras, it is necessary to control a correction amount (amount of movements) of a vibration proof lens according to a model of the lens, and to have means for setting the lens model used. Moreover, it is preferable to have means for a cameraperson being able to perform ON/OFF operation of the vibration proof function and to freely switch the mode of vibration proof control, according to image-taking intention.

In such various operation means, it is necessary to devise the location of a control unit and the like in consideration of their roles and an operating situation, and it is also desirable to have the structure of protecting the control unit lest the control unit should be damaged by unexpected collision etc. at the time of transportation and use. Furthermore, since a detachable vibration proof adapter is arranged in the middle of a lens and a camera, it is desirable to realize such a form that the detachable vibration proof adapter seems to have identification with the lens and camera in an attaching status.

SUMMARY OF THE INVENTION

The present invention is made in view of such circumstances, and is intended to provide a vibration proof adapter by which a cameraperson can easily grasp the ON/OFF status of a vibration proof function with attaching the vibration proof adapter between a lens and a camera.

The present invention is made in view of such circumstances, and is intended to provide a detachable vibration proof adapter that can maintain small size and a high-performance lens condition.

The present invention is made in view of such circumstances, and is intended to provide a vibration proof adapter that is easily detachable, and can have the simple structure of connections and a thin shape.

The present invention is made in view of such circumstances, and is intended to provide a vibration proof adapter whose various control units can be operated with attaching the vibration proof adapter between a lens and a camera, which has such a form that the detachable vibration proof adapter seems to have an identification with the lens and camera in a attaching status, and which can protect the control units.

In order to attain the above-described objects, in a vibration proof adapter arranged between a lens or a lens supporter, and a camera, the present invention is characterized in that indicating means for indicating the ON/OFF status of a vibration proof function by the vibration proof adapter concerned is provided on the periphery of the above-described vibration proof adapter, and that the above-described indicating means makes it possible that a cameraperson can check an indication status with looking at a view finder in the usual operation posture from the rear of the view finder installed in the upper part of the above-described camera.

According to the present invention, indicating means for indicating the ON/OFF status of a vibration proof function is provided in the position where a cameraperson can check an indication status with looking at a viewfinder on the periphery of a vibration proof adapter. Usually, although a cameraperson performs camera operation with looking at a viewfinder at the time of image pickup, this is devised so that the cameraperson can see the indicating means in the field of view with looking at the viewfinder in operation posture. Hence, a cameraperson can check the indication status of the indicating means without greatly moving a look from the viewfinder.

An aspect of the present invention is characterized in that the above-described indicating means is provided near at least one comer section between the upper right and the upper left of the above-described vibration proof adapter.

Since the view finder is arranged at the upper part of the vibration proof adapter with viewing the vibration proof adapter from the cameraperson, the indicating means is arranged near both the sides of the view finder by avoiding the view finder and providing the indicating means near at least one comer section between the upper right and the upper left of the vibration proof adapter. Owing to such an arrangement, the cameraperson can check the viewfinder and the indication of the indicating means simultaneously.

Another aspect of the present invention is characterized in that the above-described indicating means is constituted so that an indication status cannot be checked from a subject side to which the above-described lens is directed.

Since the ON/OFF status of the vibration proof function is the information that the cameraperson himself/herself should mainly recognize, the indication contents of the indicating means are sufficient so long as the contents can be checked from a cameraperson side. Temporarily, when it is made for the indication of the indicating means to be in sight also from the subject side, there is a possibility of mixing up the indication of a tally lamp turned on during image pickup execution with the indication of the indicating means. Hence, in order to avoid also this confusion, it is preferable to have the configuration of preventing the subject from checking the indication status of the indicating means.

Still another aspect of the present invention is characterized in that a cavity containing the above-described indicating means is formed in the above-described periphery, and that the indicating means is constituted to be retractable in the above-described cavity. While being arranged with projecting the indicating means from the cavity at the time of using the vibration proof adapter, the above-described indicating means can be contained with being immersed in the cavity at the time of disuse. Owing to the detachable structure of the indicating means, it becomes possible to make the indicating means not obstructive and to protect the indicating means at the time of transportation etc.

In order to attain the above-described objects, a vibration proof adapter arranged between a lens apparatus and a camera is characterized in that an interior of the above-described body housing is sealed with the structure that in the body housing used as the exterior of an above-described vibration proof adapter, a movable lens is contained, the movable lens which is moved so that image blurring generated by the vibration added to the above-described camera may be corrected, in order to pass the light from a subject which enters through the above-described lens apparatus, openings are formed on an optical axis of the above-described movable lens on a front face of the above-described body housing, which faces the above-described lens apparatus, and a rear face of the above-described body housing facing the above-described camera, respectively, and a first lens is attached to the opening formed in the above-described front face; and that a second lens is attached to the opening formed in the above-described rear face.

According to the present invention, the movable lens for image blurring compensation is contained in the body housing, and openings for making the light from a subject pass are formed before and after the optical axis with sandwiching the movable lens, i.e., the front face (the side connected to the lens apparatus) and the rear face (the side connected to the camera) of the body housing, respectively. The interior of the body housing is sealed by attaching the first lens on the front opening and attaching the second lens on the rear opening. Then, the movable lens is arranged in this sealed space. Owing to this structure, dust and particles do not adhere to the movable lens but a high-performance lens condition can be maintained.

Moreover, an optical system of the vibration proof adapter is constituted by the first lens, movable lens, and second lens, and since openings of the body housing are directly covered by the first lens and second lens without using transparent glass and the like for sealing, the thinning of the vibration proof adapter can be achieved.

According to still further aspect of the present invention, the above-described body housing comprises a front plate constituting the above-described front face, a rear plate constituting the above-described rear face, and a frame section that is provided on one of the above-described front plate or the above-described rear plate in one piece and constitutes the periphery of the above-described body housing, and the body housing concerned is characterized in that sections other than the above-described respective openings are attached in sealed conditions, that the above-described first lens is attached on the above-described front plate, and that the above-described second lens is attached on the above-described rear plate.

For example, while the frame section is formed on the rear plate in one piece and a box-like containing section is constituted, the front plate covers an open face (front section of the body housing) of the above-described containing section as a lid section. Of course, it is also possible to constitute a containing section with providing a frame section on the front plate in one piece, and to make the rear plate be its lid section. Assembly operation and maintenance work become easy owing to such box-like structure.

In order to achieve the above-described objects, the present invention is characterized in that, in a vibration proof adapter which is installed between a camera and a lens apparatus, a lens connection similar to the lens connection structure formed in the above-described camera is formed in the front face of the vibration proof adapter to which the above-described lens apparatus is connected, and that a camera connection similar to the camera connection structure formed in the above-described lens apparatus on the rear face of the above-described vibration proof adapter to which the above-described camera is connected is formed.

According to the present invention, a camera and a lens apparatus have predetermined connection structure. That is, the lens connection structure for the connection with the lens apparatus is provided on the front face of the camera, and the camera connection structure for the connection with the camera is provided in the rear face of the lens apparatus. The camera and lens apparatus are directly connectable with both connection structures.

Since a vibration proof adapter according to the present invention has a lens connection in a front face, which is the same as lens connection structure, on its front face and has a camera connection, which is the same as camera connection structure, on a rear face, it is possible to directly connect the vibration proof adapter according to the present invention between the lens apparatus and camera. Since the connection structure is commonized, it is not necessary to separately add dedicated connection means, and hence, the structure is not complicated. Moreover, since its connection work is common in the connection work of the lens apparatus and camera, the work is easy.

The present invention is characterized in that the above-described lens connection and the above-described camera connection are formed with hooks, hooking a lens apparatus and a camera, respectively. A box-type lens (EFP lens) used for a television camera for broadcast has a hook formed on its rear face, the camera has a hook which can engage with the hook, and both the hooks are engaged with each other for connection. It is preferable to provide on the front and rear faces of the vibration proof adapter such hooks that have compatibility with this connection structure.

The present invention is characterized in that a handle is attached on the upper face or side face of the periphery of the above-described vibration proof adapter. When performing the detaching/attaching work of the vibration proof adapter, an operator can deal with the vibration proof adapter with holding the handle, and hence workability improves.

The present invention is characterized in that a run off for a bayonet mount of the lens apparatus in the front face of the vibration proof adapter to which an above-described lens apparatus is connected is formed.

The bayonet mount is provided in the rear face so that a small camera such as an ENG camera can be also equipped with the box-type lens. The bayonet mount projects from the rear face of the lens apparatus, and a cavity (run off) that contains the bayonet mount is formed in the vibration proof adapter. If the vibration proof adapter is directly attached in the rear face of the lens apparatus, the bayonet mount will be contained in the run off, and connecting faces closely contacts with each other. Thus, owing to the provision of the run off of the bayonet mount, it becomes possible to achieve the thinning of a vibration proof adapter and the miniaturization of a television camera apparatus.

In order to achieve the above-described objects, the present invention is characterized in that, in a vibration proof adapter arranged between a lens and a camera, a control unit for operating the vibration proof adapter is formed on the peripheral side face of the above-described vibration proof adapter.

According to the present invention, a vibration proof adapter is attached between a lens apparatus and a camera, and the peripheral side face of the vibration proof adapter is exposed in attaching the adapter. Owing to arranging the control unit on the peripheral side face, an operator can operate in attaching the adapter.

The present invention is characterized in that the above-described control unit is provided in a cavity of the above-described peripheral side face lest the control unit should project from the peripheral side face of the above-described vibration proof adapter. Owing to devising the structure lest the control unit should project through providing the cavity in the peripheral side face and arranging the control unit in the cavity, it becomes possible to obtain a form that the vibration proof adapter seems to have an identification with the lens and camera in a attaching status, and that can protect the control unit.

Moreover, in the present invention, the above-described control unit includes at least one of a power ON/OFF switch, a lock knob fixing a vibration proof lens, a DIP switch for performing a magnification setup of a lens to be used, a DIP switch for setting up a vibration proof control mode about pan/tilt operation, and a test mode switch for testing a status of the vibration proof adapter on predetermined conditions.

In an aspect of providing in the control unit the DIP switch for setting a lens model, or the DIP switch for setting a vibration proof control mode about the pan/tilt operation, it is preferable that setting of the above-described DIP switch can be performed from an opening provided in the above-described peripheral side face, this opening is composed of a first opening and a second opening, the above-described first opening is covered with a first lid section fixed with screws, and the above-described second opening is covered with a second lid section that is easily detachable without a tool.

Owing to such structure, it is assumed that the DIP switches with high user's usage can be operated from the second opening which can be opened and closed with the second lid section that is easily detachable and is a rubber cap or the like, and that switches with low frequency in use or for maintenance operation can be operated from the first opening covered by the first lid section fixed with screws. For example, it is provided that the DIP switch performing the magnification setup of the above-described lens can be operated from the above-described second opening, and the DIP switch for setting a vibration proof control mode about the above-described pan/tilt operation can be operated from the above-described first opening.

The present invention is characterized in that, if the above-described lock knob is not changed into a lock status, the above-described power ON/OFF switch cannot be operated. For example, this can be realized as follows. That is, if the lock knob is made of a lever member and is changed to the status of “lock release”, the lever member advances over the power ON/OFF switch to prevent the operation of the power ON/OFF switch. On the other hand, if the knob is changed to a “lock status”, the mechanism in which the lever member evacuates from the power ON/OFF switch to enable the operation of the power ON/OFF switch.

The configuration for this purpose is not limited to the structure that prevents the operation of the power ON/OFF switch by means of such a mechanical mechanism, but can be also implemented by switching the disabling/enabling of operation of the power ON/OFF switch by an electrical control.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view of a television camera apparatus where a vibration proof adapter of an embodiment is applied;

FIG. 3 is a perspective view with viewing the vibration proof adapter of the embodiment from a front plate;

FIG. 4 is a perspective view with viewing the vibration proof adapter of the embodiment from a rear plate;

FIG. 5 is a sectional view of the vibration proof adapter of the embodiment;

FIG. 6 is an enlarged view showing the right side section of the vibration proof adapter according to this embodiment;

FIG. 8 is a rear view with viewing the television camera apparatus from the rear (cameraperson side);

FIG. 9 is an enlarged view of a principal part of the television camera apparatus according to this embodiment;

FIG. 10 is a sectional view showing the structure of an indicator provided in a vibration proof adapter;

FIG. 14 is an enlarged view of an interface portion that delivers information among a lens apparatus, a vibration proof adapter, and a camera body;

FIG. 15 is a front view showing the supporting structure of a movable lens built in the vibration proof adapter;

FIG. 16 is an explanatory diagram showing the operation at the time of the movable lens moving in a lateral direction;

FIG. 19 is a block diagram showing the whole structure of the vibration proof adapter;

DETAILED DESCRIPTION OF THE PREFERRED EMBODIMENT

Preferable embodiments of a vibration proof adapter according to the present invention will be described below in detail with referring to accompanying drawings.

Figure 2:
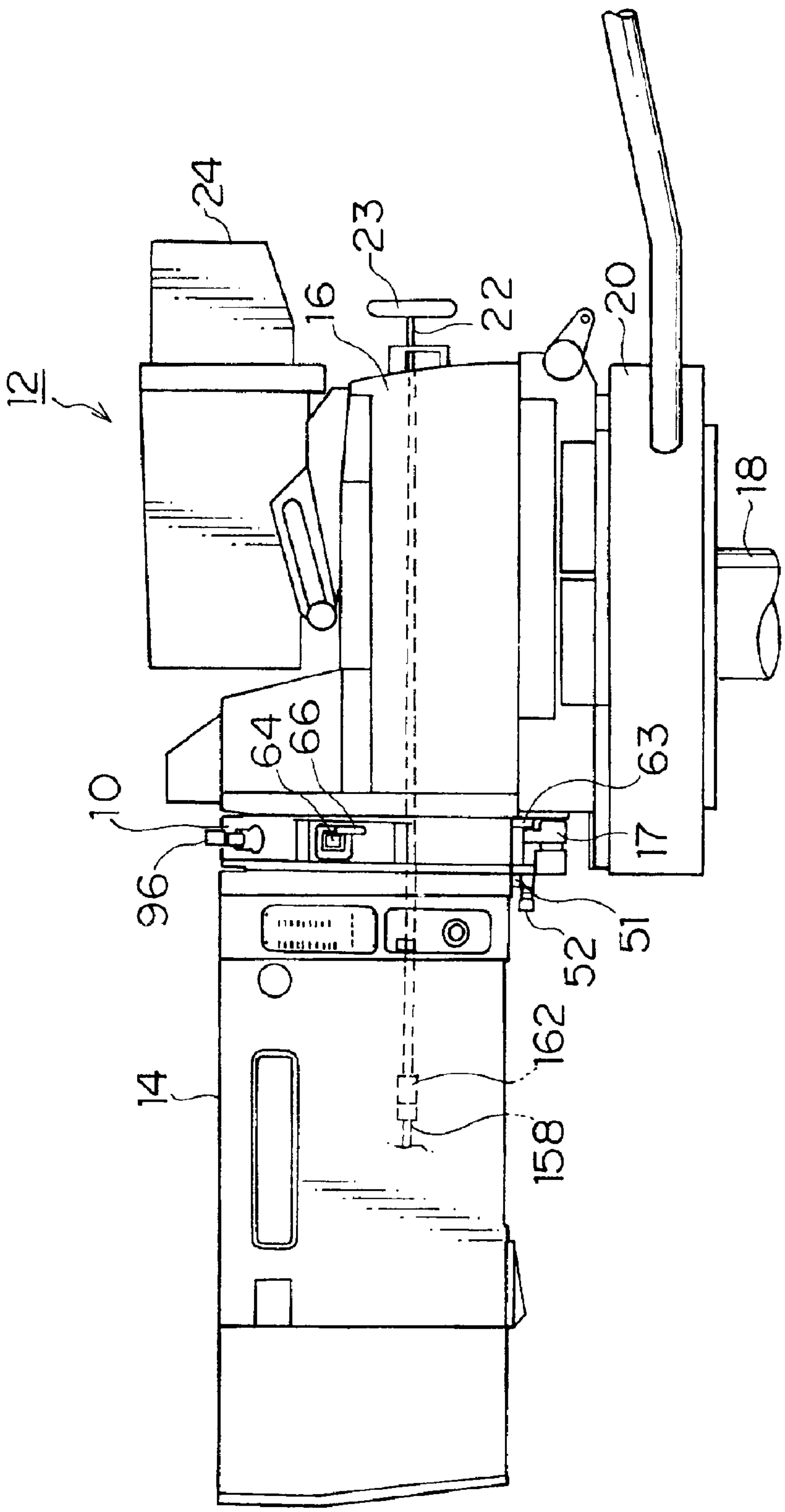
FIG. 2 is a side view of the television camera apparatus where the vibration proof adapter of the embodiment is applied.

FIGS. 1 and 2 show a television camera apparatus 12 where a vibration proof adapter 10 according to an embodiment of the present invention is applied. This television camera apparatus 12 is an apparatus where zoom and focal operation can be performed in a one-shaft/two-operation mode, and mainly comprises an EFP lens apparatus (hereafter, referred to as a lens apparatus) 14, the vibration proof adapter 10, and a camera body 16.

Figure 12:
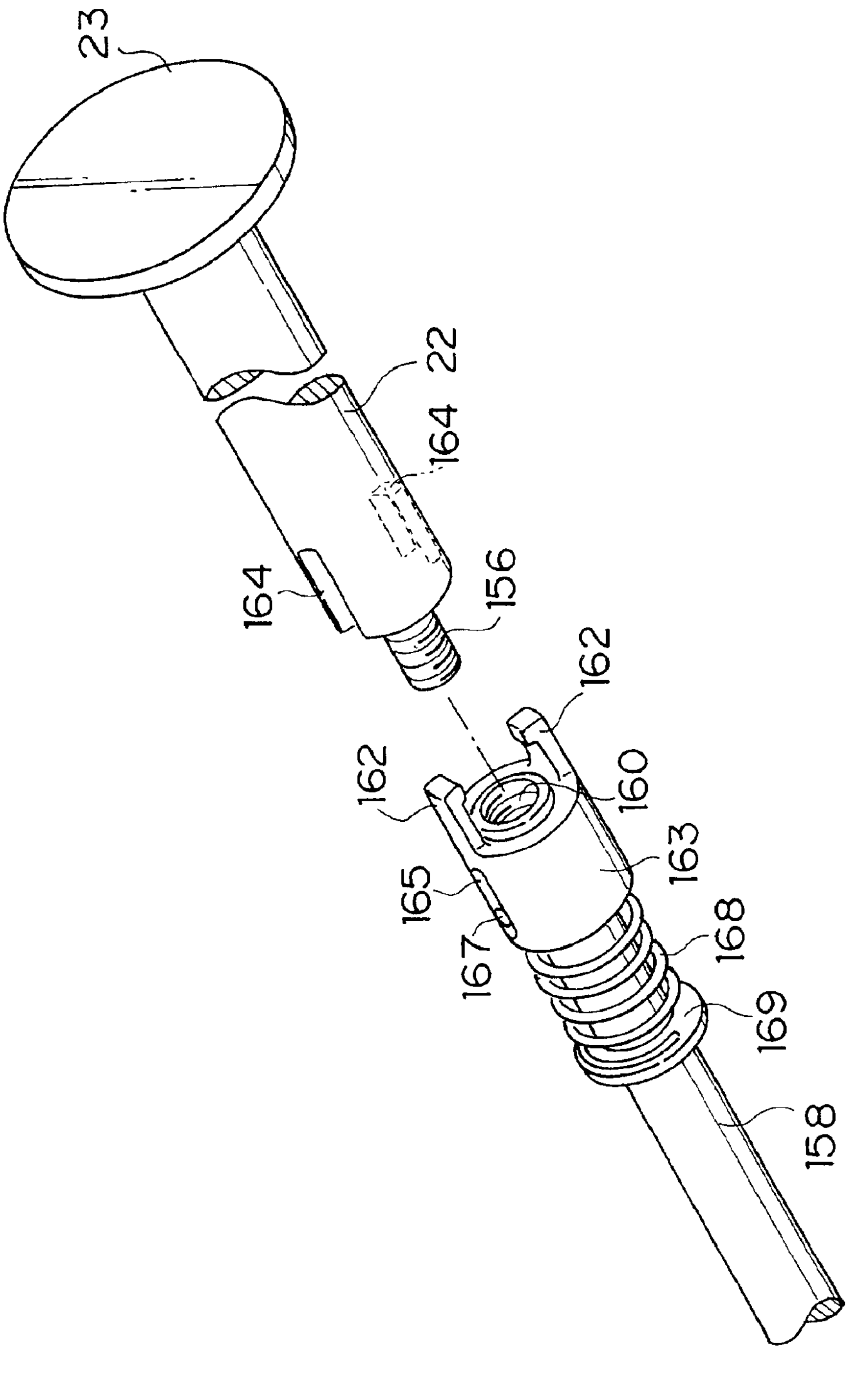
FIG. 12 is a perspective view showing the detachable structure of the operation rod.
Figure 13:
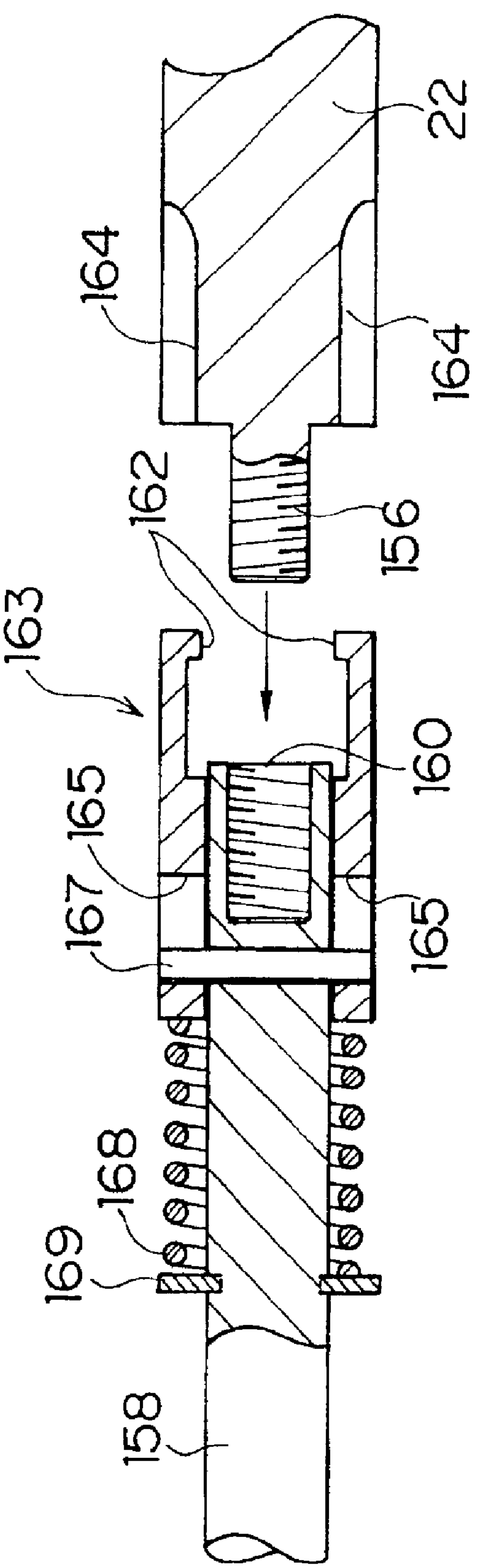
FIG. 13 is a sectional view showing the detachable structure of the operation rod.

The camera body 16 is detachably attached in a universal head 20 provided in the upper part of a tripod or a pedestal 18. An operation rod 22 can be detached and attached to the lens apparatus 14, and is arranged with penetrating the camera body 16 and vibration proof adapter 10. The operation rod 22 is made to pass through an operation rod passing-through hole 16A formed in the camera body 16, and a point of the operation rod 22 is connected to the lens driving section that is not shown but belongs to the lens apparatus 14. The detachable structure of the operation rod 22 will be described later (FIGS. 12 and 13).

Looking at an image displayed in a view finder 24 installed in the upper section of the camera body 16 shown in FIG. 1, a cameraperson can perform zoom operation by gripping a grip 23 of the operation rod 22, and pushing or pulling the operation rod 22. Moreover, it is also possible to perform focusing by rotating the operation rod 22 through rotationally operating the grip 23.

It is possible to install a zoom rate demand 26 and a focal position demand 28 in pan/tilt rods 25A and 25B that are extended from the universal head 20. The cameraperson can perform zoom operation by rotating a thumb ring 26A of the zoom rate demand 26 with his/her thumb, and can perform focal operation by rotating a focal knob 28A of the focal position demand 28.

A zoom speed command signal which orders zoom speed according to the operation direction and control input of the thumb ring 26A is outputted from the zoom rate demand 26. A focal position command signal that orders a focal position according to the rotational position of the focal knob 28A is outputted from the focal position demand 28. These command signals are transmitted to the lens apparatus 14 through cables 26B and 28B.

If the operation rod 22 and the controllers such as the zoom rate demand 26 and focal position demand 28 are provided in parallel, a switching device is provided, the switching device which is not shown but is used for switching a lens operation mode by the operation rod 22 and a lens operation mode by the zoom rate demand 26 and the focal position demand 28. Hence, an operation mode can be chosen with the switching device. In addition, it is also possible to electrically detect a motion of the operation rod 22 and to perform the servo drive of zooming and focusing. It is also possible to make the operation rod 22 also serve as an operation device in a manual operation mode and the servo mode, and to switch the role by the switching device. Such control unit serving as a unit used in the manual and servo modes is proposed in Japanese Patent Application No. 11-138616.

FIGS. 3 and 4 are perspective views showing the appearance of the vibration proof adapter 10, and FIG. 5 is a sectional view of a principal part in attaching the vibration proof adopter 10. As shown in these drawings, a body housing 30 of the vibration proof adapter 10 is formed in a flat box shape. This box shape comprises a front plate 32, a rear plate 54, and peripheral side faces 59. While the lens apparatus 14 shown in the FIG. 2 is connected to the front plate (front face) 32 of the body housing 30 shown in FIG. 3, four screw threads 34, 34, . . . which are screwed into four corners as shown in FIG. 3 fix this front plate 32 to a frame body 36 of the body housing 30.

Moreover, a cavity (run off) 38 for relieving a bayonet mount nearby the lens apparatus 14 (reference numeral 15 in FIG. 15) is formed in the approximately center portion of the front plate 32. Thus, since the bayonet mount 15 is contained in the cavity 38 when the television camera apparatus 12 is assembled if the cavity 38 is formed, the overall length of the television camera apparatus 12 can be shortened. A passing-through hole 39 is a through hole (hereafter, referred to as an operation rod hole) through which the operation rod 22 passes.

A hook (lens connection) 40 for connecting the lens apparatus 14 is provided in the upper part of the front plate 32 shown in FIG. 3. This hook 40 is formed in the same geometry as the existing hook (reference numeral 41 in FIG. 5) provided in the camera body 16.

Moreover, a connector 42 is provided in the top lower left comer section of the front plate 32 shown in FIG. 3, and this connector 42 is connected to a connector (reference numeral 170 in FIG. 14) toward the lens apparatus 14 when the lens apparatus 14 is connected to the front plate 32. Thereby, the focal distance information is provided to a CPU (represented by numeral 280 in FIG. 19) of the vibration proof adapter 10 from the lens apparatus 14. This CPU280 sets the amount of movements of the vibration proof lens 44 shown in FIG. 5 on the basis of the above-described information.

A cavity 46 is formed in the center of the lower part of the front plate 32 shown in FIG. 3, and a pin (reference numeral

48 in FIG. 5) that has spring property and is provided in a protruding manner at the rear end face of the lens apparatus 14 is fit in this cavity 46. Moreover, as shown in FIG. 3, a sandwich pressure plate 50 is provided in the lower part of the front plate 32. A supporting plate (this is the same as the supporting plate 63 shown in FIG. 4, and is shown as reference numeral 51 in FIG. 5) is held in a sandwiched and pressed manner between the sandwich pressure plate 50 and front plate 32 by inserting the supporting plate 51 toward the lens apparatus 14 between this sandwich pressure plate 50 and front plate 32, fixing the sandwich pressure plate 50 with screws 52 and 52 (refer to FIGS. 2, 21, and 22). Thus, the lens apparatus 14 is connected to the front plate 32 of the vibration proof adapter 10 through the hook 40, pin 48, and sandwich pressure plate 50.

On the other hand, the rear plate (rear face) 54 of the body housing 30 shown in FIG. 4 is formed with the frame body 36 in a piece which constitutes peripheral side faces 59, and the camera body 16 shown in the FIG. 2 is connected to the rear plate 54.

A bayonet mounting 55 is provided in a projecting manner in the approximately center section of the rear plate 54. Although this bayonet mounting 55 is used when a hand held cameras such as an ENG camera is connected, when the box-type camera body 16 shown in FIG. 2 is connected, the camera body 16 is connected with using the hook (camera connection) 56 provided in the upper part of the rear plate 54 shown in FIG. 4. In addition, when using a hand held camera, a lens supporter (reference numeral 350 in FIG. 21) is used. While the rear face of the vibration proof adapter 10 is connected to the front face of the lens supporter 350, the bayonet mounting 55 of the vibration proof adapter 10 is connected to a camera (reference numeral 360 in FIG. 21) through the lens supporter 350.

The hook 56 shown in FIG. 4 is formed in the same geometry as the existing hook (reference numeral 57 in FIG. 5) provided in the rear end section toward the lens apparatus 14. Moreover, the bayonet mount 55 is also constituted in the same structure as the bayonet mount 15 of the lens apparatus 14.

A connector 58 is provided in a top lower right corner section of the rear plate 54 shown in FIG. 4, and this connector 58 is connected to a connector (reference numeral 172 in FIG. 14) of the camera body 16 when the camera body 16 is connected to the rear plate 54. The connector 58 and the connector 42 shown in FIG. 3 are connected with a cable (reference numeral 174 in FIG. 14) which is arranged in the body housing 30, and various kinds of information is transmitted through the cable 174 between the lens apparatus 14 and camera body 16.

A pin 60 that has spring property is provided in a projecting manner in the center of the lower part of the rear plate 54 shown in FIG. 4. This pin 60 is fit in a cavity (reference numeral 62 in FIG. 5) formed in the front-end section of the camera body 16. Moreover, this pin 60 is formed in the same geometry as the existing pin 48 provided in the rear end section of the lens apparatus 14.

As shown in FIG. 4, a supporting plate 63 is formed in a projecting manner in the lower part of the rear plate 54 downward. This supporting plate 63 is held in a sandwiched and pressed manner by a sandwich pressure member (reference numeral 17 in FIG. 2) provided in the camera body 16. Thus, the camera body 16 is connected to the rear plate 54 of the vibration proof adapter 10 though the hook 56, pin 60, and sandwich pressure member 17.

The cavity 62 is formed in the right-hand side of the frame body 36 shown in FIG. 3, and in this cavity 62, a power switch 64 and a lever 66 for fixing the vibration proof lens are provided without protruding from the cavity 62. The power switch 64 turns on/off the power supply of the vibration proof adapter 10, and when turning on the power supply, electric power is supplied to a circuit of the vibration proof adapter 10 to activate an oscillating detection sensor (reference numeral 284 in FIG. 19).

In addition, when the power supplied from the camera body 16 is insufficient, the power is supplied to the vibration proof adapter 10 from an AC adapter by connecting a cable connector of the AC adapter, which is not shown, to the power supply connector 68 provided in the lower part of the body housing 30 shown in FIG. 3. It is possible to connect a battery (shown as reference numeral 294 in FIG. 19) to the power supply connector 68, and it is also possible to build in a battery power supply and to perform diving by a battery 294.

It is also preferable to make the vibration proof adapter 10 have a function that a user can select a power supply source manually or automatically. If the power supply serviceability from the camera is low and another power supply (external power) supplies the power, another power supply is automatically given the priority. When there is no supply from another power supply, the power source is automatically selected so that the power supply of the camera may be incorporated. Moreover, it is also good to provide a changeover switch that can select only another power supply. Furthermore, there is a form of making the vibration proof adapter 10 have a function that another power supply can supply the power only when the camera is ON.

It is possible to operate ON (enabled)/OFF (disabled) of the vibration proof function in the vibration proof adapter 10 with a controller (shown as reference numeral 310 in FIG. 19) connected to the controller connector 70 of FIG. 4 that is provided in the lower part of the body housing 30 through the cable not shown. A momentary switch with an indicator which indicates the ON/OFF status of the vibration proof function can be attached in the controller 310 provided near a cameraperson's fingers (near the end section of the pan/tilt operation rods 25A and 25B etc.). As an example of an operating method, it is possible to turn on the vibration proof function only when the momentary switch is being depressed, and to turn off the vibration proof function when the switch is released from the depression. Moreover, it is also good to provide a changeover switch such as a toggle switch in parallel to this, and to switch a function of the momentary switch by switching this change-over switch so that the vibration proof function is turned off only when the momentary switch is being depressed, and that the vibration proof function is turned on when the depression of the switch is depressed.

Thus, an inverting function is provided in the ON/OFF switch of the vibration proof function, and makes it possible to select a mode of turning on the vibration proof function only when the switch is being depressed, or a mode of turning off the vibration proof function only when the switch is being depressed. This is because there are two operation modes according to camerapersons and image-taking scenes: a mode that the vibration proof function is turned on when necessary; and a mode that the vibration proof function is always turning on, and is turned off only when required.

As shown in FIGS. 3 and 4, the power supply connector 68 and the controller connector 70 are provided in the outside slant face of projections 72 and 72 whose sectional views are triangular and which are formed in the lower part of the body housing 30. Thereby, the power supply connector 68 and the controller connector 70 are arranged in the externally oblique direction in the lower part. On the other hand, since there is the universal head 20 shown in FIG. 2 under the connectors 68 and 70 when connectors 68 and 70 are arranged just downward, it is difficult to perform attaching and detaching operation of cables and routing the cables. Therefore, the vibration proof adapter 10 where the connectors 68 and 70 are arranged in the externally oblique directions in the lower part makes attaching and detaching operation and routing of the cables for the connectors 68 and 70 easy.

The lever 66 for fixing the vibration proof lens that is shown in FIG. 3 is connected to a mechanism (described in detail in FIG. 20) fixing a vibration proof lens (reference numeral 44 in FIG. 5) built in the body housing 30 may not be moved (locked). The lever 66 fixes or unfixes the vibration proof lens 44 by activating a lock mechanism through pushing operation and rotational operation.

A position of the lever 66 that is shown by solid lines in FIG. 3 is a fixed position of the vibration proof lens 44, and the position of the lever 66 that is shown by alternate long and two short dashes lines in FIG. 3 top is an unfixed (free) position of the vibration proof lens 44. In this free position, the power switch 64 is interfered by the lever 66 and is not operable, but, since the lever 66 is evacuated from the power switch 64, the power switch 64 is operable. Therefore, since the ON/OFF operation of the power switch 64 is possible only in an above-described fixed position, the vibration proof lens 44 is surely fixed when the power switch 64 is OFF. Hence, since the free status of the vibration proof lens 44 at the time of the power supply being OFF can be prevented, the vibration proof lens 44 and the vibration proof mechanism can be protected from vibration produced, for example, at the time of transfer off the vibration proof adapter 10. The structure of the vibration proof mechanism will be described later (FIGS. 15 to 18).

The vibration proof lens 44, as shown in FIG. 5, comprises a first fixed lens 74, a movable lens 76, and a second fixed lens 78. The first fixed lens 74 is fixed to a lens frame 80 provided in the cavity 38, and the second fixed lens 78 is fixed to a lens frame 82 provided inside the bayonet mount 55. The movable lens 76 is connected to the above-described vibration proof mechanism in being held by the lens frame 77, and is moved by this vibration proof mechanism in the field which perpendicularly intersects with an optical axis P to correct image blurring substantially. This movable lens 76 is fixed/unfixed by the lever 66 for fixing the vibration proof lens.

The lens frame 80 holding the first fixed lens 74 is a member that is composed of a part, constituting the geometry of the cavity 38, in one piece, and is fixed to the front plate 32 with screws 81. Moreover, the bayonet mount 55 to which the second fixed lens 78 is fixed is fixed to the rear plate 54 with screws 83. In this way, the movable lens 76 is arranged in the space that is closed by the first fixed lens 74 and the second fixed lens 78.

In order to form an optical path that passes light from a subject that enters through the lens apparatus 14, the body housing 30 of the vibration proof adapter 10 has an opening in each of the front plate 32 and rear plate 54. The first fixed lens 74 is attached on the opening in the front plate 32, and the second fixed lens 78 is attached on the opening in the rear plate 54. In this way, the body housing 30 is sealed with the first fixed lens 74 and the second fixed lens 78.

Since the movable lens 76 is arranged in this sealed space, there is an advantage that the adhesion of dust and particles does not occur and a high performance lens can be kept. Moreover, supposing the structure that the first fixed lens 74 and the second fixed lens 78 are covered with glass or the like, the thickness of the adapter becomes large. Hence, it becomes possible to make the thickness of the vibration proof adapter 10 as thin as possible owing to the structure like this embodiment that the first fixed lens 74 and the second fixed lens 78 are exposed.

Here, a focal distance of the vibration proof lens 44 is extended 1.25 times to shift an image-formation position behind by an amount equal to the thickness of the vibration proof adapter 10. This extension rate (1.25 times) of the focal distance is changed according to the thickness of the vibration proof adapter 10.

On the other hand, a cavity 84 is formed in the right-hand side of the frame body 36 shown in FIG. 4, and a switch group, not shown, is arranged at this cavity 84. Although later mentioned about the detail of the switch group (FIGS. 6 to 7), this switch group is arranged in the inner part of an opening (reference numeral 100 in FIG. 6) plugged with a cover plate 86 detachably attached in the cavity 84. Moreover, a smaller opening (reference numeral 112 in FIG. 6) is formed in the cover plate 86, and this opening 112 is detachably plugged with a rubber cap 88.

A handle 90 is provided in the top face of the body housing 30. The attachment and detachment of the vibration proof adapter 10 from the lens apparatus 14 and the camera body 16 is performed with using this handle 90. At the time of the attachment and detachment work of the vibration proof adapter 10, since an operator can hold the handle 90 and can deal with the vibration proof adapter 10, workability improves. In addition, the attached position of the handle 90 is not limited to the top face of the body housing 30, but a side face is also sufficient.

The vibration proof adapter 10 is installed by making the hook 56 of the vibration proof adapter 10 engaged with the hook 41 of a camera body 16 while making the hook 57 of the lens apparatus 14 engaged with the hook 40 of the vibration proof adapter 10, as shown in FIG. 5. The tapered face formed at about 45° of tilt angle is formed in each of these hooks 40, 57, 41, and 56, and the vibration proof adapter 10 is installed by making these tapered faces engaged with each other. In addition, the bayonet mount 55 is contained in a cavity (mount relief) 91 formed in the camera body 16.

A locator pin 92 is provided in a projecting manner in the hook 57 of the lens apparatus 14. This pin 92 is engaged with a groove 93 formed in the center section of the hook 40 in the vibration proof adapter 10. In the fitting of the vibration proof adapter 10 and the lens apparatus 14, when the hook 40 in the adapter is made to be engaged with the hook 57 in the lens apparatus, optical axes of the lens apparatus 14 and the vibration proof adapter 10 coincide with each other in the vertical direction. When the groove 93 is made to be engaged with the pin 92, both optical axes coincide with each other in the horizontal direction. Thereby, both optical axes coincide with each other.

On the other hand, the locator pin 94 is provide in a projecting manner in the hook 56 of the rear side of the vibration proof adapter 10. This pin 94 is engaged with the groove 95 formed in the center section of the hook 41 in the camera body 16 shown in FIG. 5. In the fitting of the vibration proof adapter 10 and the camera body 16, the hook 41 in the camera apparatus is made to be engaged with the hook 56 in the adapter. Then, the optical axes of the camera body 16 and the vibration proof adapter 10 coincide with each other in the vertical direction. In addition, when the pin 94 is made to be engaged with the groove 95, both optical axes coincide with each other in the horizontal direction. Thereby, since both optical axes coincide with each other, each optical axis of the lens apparatus 14, vibration proof adapter 10, and camera body 16 coincide with one another.

Then, while fixing the supporting plate 51 in the lower part of the rear end section of the lens apparatus 14 with fastening the plate 51 with the sandwich pressure plate 50 of the vibration proof adapter 10, the supporting plate 63 of the vibration proof adapter 10 is fixed with the sandwich pressure member 17 of the camera body 16. Hence, the vibration proof adapter 10 is fixed between the lens apparatus 14 and camera body 16.

According to the vibration proof adapter 10 concerning this embodiment, the same hook 40 (lens connection) and hook 56 (camera connection) as hooks 57 and 41 for connecting the lens apparatus 14 and camera body 16 are provided in the front plate 32 and rear plate 54 of the vibration proof adapter 10. Hence, the vibration proof adapter 10 is directly connectable between the lens apparatus 14 and camera bodies 16.

Moreover, the hook 40 in the front face of the vibration proof adapter 10 is common with the hook 41 in the front ace of the camera body 16, and the hook 56 in the rear face of the vibration proof adapter 10 is common with the hook 57 in the rear face of the lens apparatus 14. Hence, it is not necessary to separately add dedicated connecting means, a mechanism is also easy, and connecting work is also easy.

Furthermore, this embodiment has the structure that the cavity 38 which is a run off of the bayonet mount 15 is formed in the front plate of the vibration proof adapter 10, and the bayonet mount 15 of the lens apparatus 14 is contained in the cavity 38 at the time of connecting the lens apparatus 14 to closely contact the rear face of the lens apparatus 14 with the front plate 32 of the vibration proof adapter 10. Hence, it is possible to achieve thinning of the vibration proof adapter 10 and the miniaturization of the television camera apparatus 12.

According to the vibration proof adapter 10 concerning this embodiment, the same hook 40 (lens connection) and hook 56 (camera connection) as hooks 57 and 41 for connecting the lens apparatus 14 and camera body 16 are provided in the front plate 32 and rear plate 54 of the vibration proof adapter 10. Hence, the vibration proof adapter 10 is directly connectable between the lens apparatus 14 and camera bodies 16.

Moreover, the hook 40 in the front face of the vibration proof adapter 10 is common with the hook 41 in the front ace of the camera body 16, and the hook 56 in the rear face of the vibration proof adapter 10 is common with the hook 57 in the rear face of the lens apparatus 14. Hence, it is not necessary to separately add dedicated connecting means, a mechanism is also easy, and connecting work is also easy.

Furthermore, this embodiment has the structure that the cavity 38 which is a run off of the bayonet mount 15 is formed in the front plate of the vibration proof adapter 10, and the bayonet mount 15 of the lens apparatus 14 is contained in the cavity 38 at the time of connecting the lens apparatus 14 to closely contact the rear face of the lens apparatus 14 with the front plate 32 of the vibration proof adapter 10. Hence, it is possible to achieve thinning of the vibration proof adapter 10 and the miniaturization of the television camera apparatus 12.

According to the vibration proof adapter 10 concerning this embodiment, the same hook 40 (lens connection) and hook 56 (camera connection) as hooks 57 and 41 for connecting the lens apparatus 14 and camera body 16 are provided in the front plate 32 and rear plate 54 of the vibration proof adapter 10. Hence, the vibration proof adapter 10 is directly connectable between the lens apparatus 14 and camera bodies 16.

Moreover, the hook 40 in the front face of the vibration proof adapter 10 is common with the hook 41 in the front ace of the camera body 16, and the hook 56 in the rear face of the vibration proof adapter 10 is common with the hook 57 in the rear face of the lens apparatus 14. Hence, it is not necessary to separately add dedicated connecting means, a mechanism is also easy, and connecting work is also easy.

Furthermore, this embodiment has the structure that the cavity 38 which is a run off of the bayonet mount 15 is formed in the front plate of the vibration proof adapter 10, and the bayonet mount 15 of the lens apparatus 14 is contained in the cavity 38 at the time of connecting the lens apparatus 14 to closely contact the rear face of the lens apparatus 14 with the front plate 32 of the vibration proof adapter 10. Hence, it is possible to achieve thinning of the vibration proof adapter 10 and the miniaturization of the television camera apparatus 12.

As shown in FIGS. 3 and 4, the indicators 96 and 96 which indicate the ON/OFF status of the vibration proof function are provided in the upper parts of the right and left sides (near the right and left comer sections of the peripheral side faces 59) of the body housing 30. FIGS. 8 to 10 describe the detail of an indicator 96.

Figure 7:
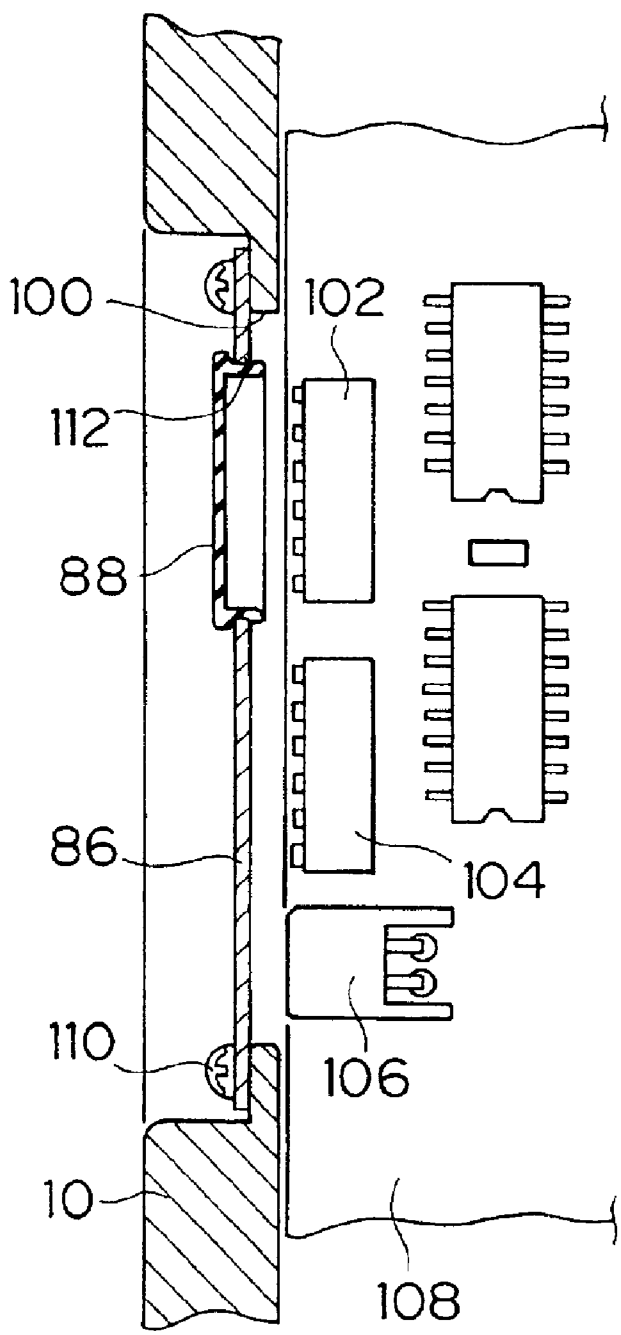
FIG. 7 is a sectional view taken on line 7—7 line in FIG. 6.

FIG. 6 is an enlarged view of the right side section of the vibration proof adapter 10, and FIG. 7 is a sectional view taken in line 7—7 in FIG. 6. As shown in these drawings, the opening 100 is formed in the right side face of the outer periphery of the vibration proof adapter 10, and DIP switches 102 and 104 and the connector 106 are arranged in the inner part of the opening 100. An electronic circuit board 108 is a board where the DIP switches 102 and 104, connector 106, and other electronic parts are mounted.

Out of the DIP switches 102 and 104 vertically located in FIG. 6, the upper DIP switch 102 is a lens selecting switch, and the lower DIP switch 104 functions as a pan/tilt control switch, and a test mode switch. The lens selecting switch is used for setting the switch according to the model of a lens to be attached.

The lens selecting switch is applicable to various magnifications of lenses such as 55×, 66×, 70×, 80×, and 87×, and can be attached to various high-magnifications of field lenses such as a Hi-Vision television lens (HD lens).

A CPU 280 in the vibration proof adapter 10 on the basis of the setting of the lens selecting switch performs the processing of making the focal distance information received from the lens apparatus 14 agree with the focal distance information stored in memory (shown by reference numeral 286 in FIG. 19) of the vibration proof adapter 10.

The pan/tilt control switch switches each mode among a mode in which a motion in the pan direction and the tilt direction is automatically detected, a mode in which only a motion in the pan direction is automatically detected, and a mode in which only a motion in the tilt direction is automatically detected. Alternatively, the pan/tilt control switch is a switch for performing mode selection among a mode of enabling vibration proof operation only in the vertical direction, a mode of enabling vibration proof operation only in the horizontal direction, a mode enabling vibration proof operation in the vertical and horizontal directions. By selecting the mode of pan/tilt control according to necessity, the "swinging back" phenomenon at the time of the pan/tilt operation (phenomenon of the image blurring produced by performing the vibration proof operation which detects the pan/tilt operation performed by the cameraperson as vibration to correct this) can be suppressed to the minimum.

The test mode switch is a switch used when using the test mode in which the status of the lens in the focal distance can be tested only by the vibration proof adapter 10.

The opening 100 has the size in which the operation faces of the DIP switches 102 and 104 and the connector 106 can be exposed, and the opening 100 is covered by the cover plate 86. Since the cover plate 86 is fixed to the vibration proof adapter 10 by the setscrews 110 in four corners, the cover plate 86 can be removed by removing the setscrews 110 with using a tool not shown.

The cover plate 86 has the opening 112 in a position corresponding to the DIP switch 102, and this opening 112 is plunged with the rubber cap 88. The opening 112 has the size in which the operation side of the DIP switch 102 can be exposed, and the operation of the DIP switch 102 becomes possible by removing the rubber cap 88. The rubber cap 88 can be easily detached and attached without tools (i.e., with a bare hand). In addition, a door, a slide window, and the like which can be simply opened and closed by hand may be applied instead of the rubber cap 88.

The DIP switch 102 that a user frequently operates can be operated from the opening 112 which can be opened and closed by the lid section, which is easily attached and detached, such as the rubber cap 88. On the other hand, a switch (in this example, a DIP switch with reference numeral 104) that is hardly operated or is used for maintenance operation can be operated from the opening 100 covered by the cover plate 86 fixed with setscrews 110.

Moreover, according to the vibration proof adapter 10 of this example, since various control units (64, 66, 102, 104) are formed in the peripheral side face 59 of the body housing 30, various kinds of operation concerning the vibration proof adapter 10 can be performed in attaching the adapter. In particular, this has the structure that the concavities 62 and 84 are provided in the peripheral side face 59, the control units are arranged in the concavities 62 and 84, and hence, the control units do not protrude. Hence, it becomes possible to obtain a form that the vibration proof adapter seems to have an identification with the lens and camera in an attaching status, and that can protect the control units.

FIG. 8 is a rear view of the television camera apparatus 12. Various switches 120 and connectors 122 are provided besides the grip 23 of the operation rod 22 in the rear face of the camera body 16. Reference numeral 124 denotes a handle of the camera.

As shown in this drawing, the indicators 96 provided in the right and left both sides of the upper part of the vibration proof adapter 10 each has the structure that a lamp 96B is arranged at the tip of an arm 96A, and each lamp 96B turns on/off according to the ON/OFF status of the vibration proof function.

A basis of the arm 96A is rotatably supported by the frame body 36 of the vibration proof adapter 10, and when taking an image, the lamp 96B is located beside the view finder 24 by standing the arm 96A as shown in FIG. 8. At this time, the indicator 96 stands up so that the indicator 96 may not lap with an angle adjusting knob 126 of the view finder 24, and the lamp 96B enters into a field of view when a cameraperson looks at the view finder 24. A range enclosed with alternate long and short dash lines shown by reference numeral 128 in FIG. 8 shows a visual field range when the cameraperson is looking at the view finder 24 in usual operation posture. Hence, even if the cameraperson does not move a look from the view finder 24, he/she can check the lighting status of the lamp 96B.

FIG. 9 is an enlarged view of the vicinity of the indicator 96, and FIG. 10 is a sectional view of the principal part. As shown in these drawings, a cavity 130 for containing the indicator 96 is formed in the peripheral side face of the vibration proof adapter 10. At the time of storage, the indicator 96 is dropped in the cavity 130 so that the indicator 96 may not project from the peripheral side face 59 of the vibration proof adapter 10.

The basis of the arm 96A of the indicator 96 is rotatably supported by the shaft 132. Moreover, the lamp 96B is rotatably supported at the tip of the arm 96A, and it is possible to face an indication face (lighting face) of the lamp 96B to the cameraperson (side behind the camera) by rotating the lamp 96B with a rotation shaft 134 along the longitudinal direction of the arm 96A as the center.

A face (face directed to a subject) opposite to the indication face of the lamp 96B is covered with a light shielding member 135 so that the light of the lamp 96B may not leak. Thus, the indication face of the lamp 96B is turned only toward a cameraperson, and a subject cannot check the indication of the lamp 96B. This is to prevent confusion with the indication by a tally lamp that indicates the execution of image-taking. In addition, since a red lamp is usually used as a tally lamp, it is also preferable to prevent confusion with using lighting color other than red (orange, green, etc.) for the lamp 96B of the indicator 96 which indicates the ON/OFF status of the vibration proof function. Moreover, it is also good to display the information that shows the ON/OFF status of the vibration proof function in the view finder 24 with using the lighting signal of the lamp 96B.

As a modified example of the indicator 96 shown in FIGS. 8 to 10, the arm 96A can also have the structure of being freely extended and contracted in the longitudinal direction. Moreover, it is also possible to apply a mode of supporting the basis of the arm 96A with a universal joint etc. or to apply flexible material to the arm 96A so that the position of the lamp 96B can be arbitrarily changed. Moreover, although the indicators 96 are provided in the right and left sides of the vibration proof adapter 10 in this example, it is also good to provide the indicator 96 only in either of both sides.

Figure 11:
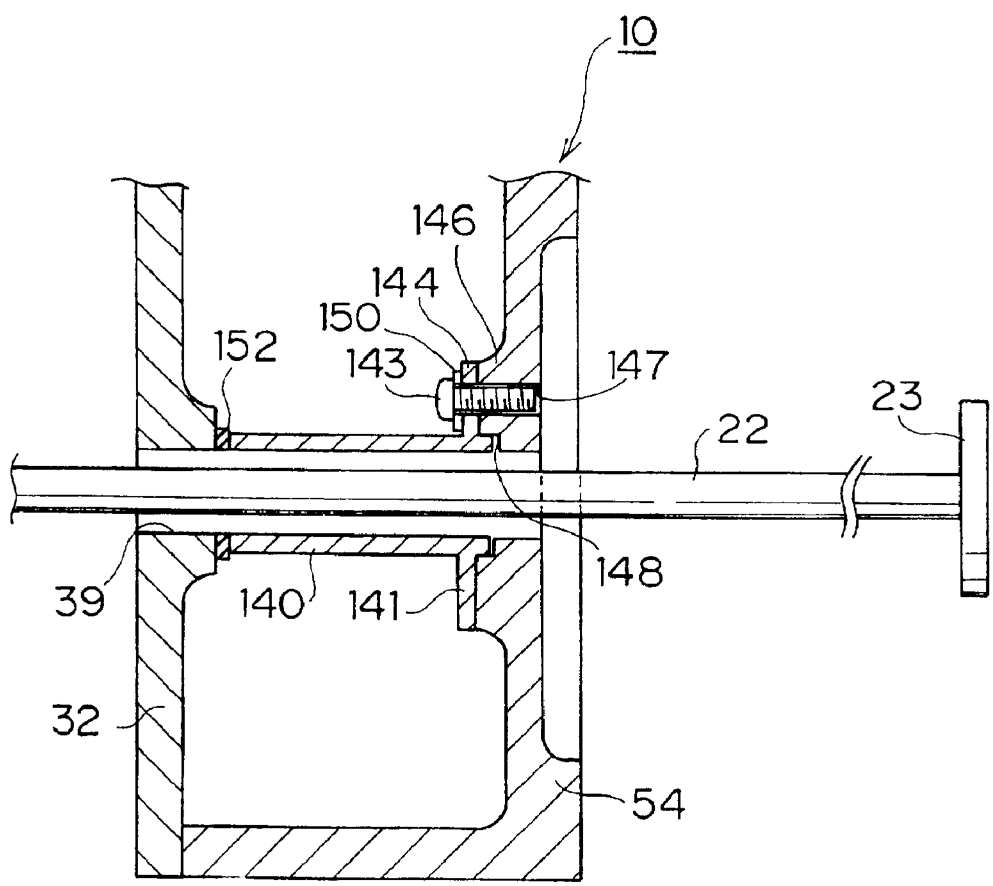
FIG. 11 is a sectional view showing the structure of an operation rod hole where an operation rod is inserted.

FIG. 11 is a sectional view showing the structure of the operation rod hole 39 formed in the vibration proof adapter 10. A cylindrical light shielding member (hereinafter, a shading cylinder) 140 is attached in the operation rod hole 39 that penetrates the front plate 32 and rear plate 54. A flange section 141 is formed in one end (right-hand end in the drawing) of the shading cylinder 140, and a plurality of run-through holes (for example, three locations equally split at 120 degrees) 144 for setscrews 143 are provided in the flange section 141.

An attachment section 146 for fixing the flange section 141 of the shading cylinder 140 is formed inside the rear plate 54, and tapped holes 147 and a stepped groove 148 for positioning are provided in the attachment section 146. The shading cylinder 140 is fixed to the rear plate 54 by screwing the setscrews 143 into the tapped holes 147 through washers 150 after fitting a rear end section (right-hand end in FIG. 11) of the shading cylinder 140 to the stepped groove 148 and aligning the positions of the run through holes 144 with the tapped holes 147.

The end (left-hand end in FIG. 11) of the shading cylinder 140 opposite to the flange section 141 is connected to the front plate 32. A sealing member 152 is provided in a connecting section of the shading cylinder 140 and front plate 32, and the interior of the vibration proof adapter 10 is sealed by the sealing member 152. Since the operation rod hole 39 is sealed and shielded by the shading cylinder 140 and sealing member 152, dust and particles does not enter into the interior of the vibration proof adapter 10, and unnecessary light is not entered.

FIG. 12 is a perspective view showing the attaching and detaching mechanism of the operation rod 22, and FIG. 13 is a sectional view of the principal part. As shown in these drawings, an external thread section 156 is formed at the tip of the operation rod 22, and an internal thread section 160 is formed at the tip of the operation rod connecting shaft (hereinafter, a connecting shaft) 158 in the lens apparatus 14. Moreover, the pawl member 163 which has a couple of pawls 162 is provided in an end section of the connecting shaft 158, and grooves 164 with which the couple of pawls 162 engages are formed in the operation rod 22.

Slots 165 are formed in the periphery of the pawl member 163, and the slots 165 have long geometry in the axial direction of the connecting shaft 158. A pin 167 that projects in the radial direction is fixedly provided in the connecting shaft 158. The pin 167 is loosely inserted into the slots 165, and while the pawl member 163 is movable to the axial direction of a connecting shaft 158 in a range of the slots 165, the motion on the rotary direction with centering the connecting shaft 158 is regulated.

The pawl member 163 is pushed rightward in FIG. 12 by a the spring 168. In addition, a spring-holding ring 169 supports a basis of the spring 168, and the ring 169 is fixedly provided in the connecting shaft 158. The pawl member 163 is evacuated leftward in FIG. 12 at the time of connecting the operation rod 22, and the external thread section 156 of the operation rod 22 is screwed into the internal thread section 160 of the connecting shaft 158. After that, the pawl member 163 is released from the evacuation and the pawls 162 are engage with the groove 164. In this way, the operation rod 22 is connected to the connecting shaft 158. Such connecting work is performed on a cavity, which is formed in a side of the lens apparatus 14 and is not shown, with exposing an end section of the connecting shaft 158. In addition, when removing the operation rod 22, a procedure contrary to connecting procedure is used.

FIG. 14 is an enlarged view of an interface portion for delivering information between the lens apparatus 14, vibration proof adapter 10, and camera body 16. The connector 170 of the lens apparatus 14 is connected to the connector 42 of the vibration proof adapter 10 that is in the front face, and the connector 172 of the camera body 16 is connected to the connector 58 of the vibration proof adapter 10 that is in the rear face.

The connectors 42 and 58 of the vibration proof adapter 10 are connected with each other by the cable 174, and the information from the lens apparatus 14 is transmitted to the camera body 16 through the inside of the vibration proof adapter 10. Moreover, some pins of respective connectors 42 and 58 are connected to an electronic circuit board 178 in the vibration proof adapter 10 through a cable 176. This electronic circuit board 176 is a control board on which the control circuit (CPU 280) of the vibration proof adapter 10 etc. are mounted. The CPU 280 fetches required information (for example, focal distance information, extender information, etc. on a lens) from the lens apparatus 14 or camera body 16, and uses it for the motion control of the movable lens 76 etc.

Thus, by forming an informational transfer path inside the vibration proof adapter 10, it becomes unnecessary to route the cables for information transfer outside the vibration proof adapter 10, and workability improves.

Next, an example of the vibration proof mechanism applied to the vibration proof adapter 10 will be described.

FIG. 15 is a front view showing the supporting structure of the movable lens 76. The movable lens 76 is moved in the direction of compensating image blurring in the field that perpendicularly intersects with the image-taking optical axis P by linear motors 244 and 246. The movable lens 76 is movably supported inside the rear plate 54 through a parallel link mechanism that comprises four arms 248, 248, 250, and 250.

The linear motor 244 moves the movable lens 76 in a lateral direction in FIG. 15, and comprises a motor body 244A, and a rod 244B. The motor body 244A is fixed to the rear plate 54, and the tip of the rod 244B is engaged with a slot 252 of the lens frame 77 through the roller 254. The slot 252 is formed in the left-hand section of the lens frame 77 in the vertical direction in this drawing, and is engaged with the roller 254 movably in the vertical direction in FIG. 15 relatively.

When the rod 244B extends and contracts with the driving force of the motor body 244A, as shown in FIG. 16, the movable lens 76 is pushed by the rod 244B, or pulled by the rod 244B to move in the lateral direction in FIG. 16. Moreover, when the force in the vertical direction is applied to the lens frame 77 in FIG. 15, the roller 254 is guided by the slot 252 and the movable lens 76 moves in the vertical direction in FIG. 15.

A connection frame 256 is fixed to the rod 244B of the linear motor 244. This connection frame 256 is arranged in the vertical direction in FIG. 15, the rod 244B is fixed in a center section, and the vertical end sections are slidably supported by linear guides 258 and 258 respectively. The linear guides 258 and 258 are provided in parallel with the rod 244B, and when the rod 244B is extended and contracted, the connection frame 256 moves in parallel in the lateral direction with keeping the posture.

The tip of contact needle 260B for detection of a position sensor 260 is contacted with pressure to the connection frame 256. As for the position sensor 260, a sensor body 260A is fixed to the rear plate 54 at a position where the contact needle 260B for detection becomes parallel to the rod 244B. The sensor body 260A detects a moving amount of the connection frame 256 that moves in parallel with extending and contracting operation of the rod 244B.

As for the position sensor 260 of this embodiment, the contact needle 260B for detection is not made to directly contact to the periphery of the lens frame body 77, but is made to contact to the connection frame 256 by which the moving amount of the movable lens 76 can be indirectly detected. The connection frame 256 moves in parallel with keeping the posture without relation to the amount of extension and contraction of the rod 244B as described above. Hence, the contact needle 260B for detection neither shifts nor slips from the connection frame 256 during the movement.

A bobbin 262A constitutes a speed generator 262, and a core 262B constitutes a speed generator 262. This core 262B is fixed to the connection frame 256.

On the other hand, the linear motor 246 moves the movable lens 76 in the vertical direction in FIG. 15, and comprises a motor body 246A and a rod 246B. The motor body 246A is fixed to the rear plate 54, and the tip of the rod 246B is engaged with a slot 264 of the lens frame 77 through the roller 266. The slot 264 is formed in the bottom section of the lens frame 77 in the lateral direction in FIG. 15, and is engaged with the roller 266 movably in the horizontal direction in FIG. 15 relatively.

Figure 17:
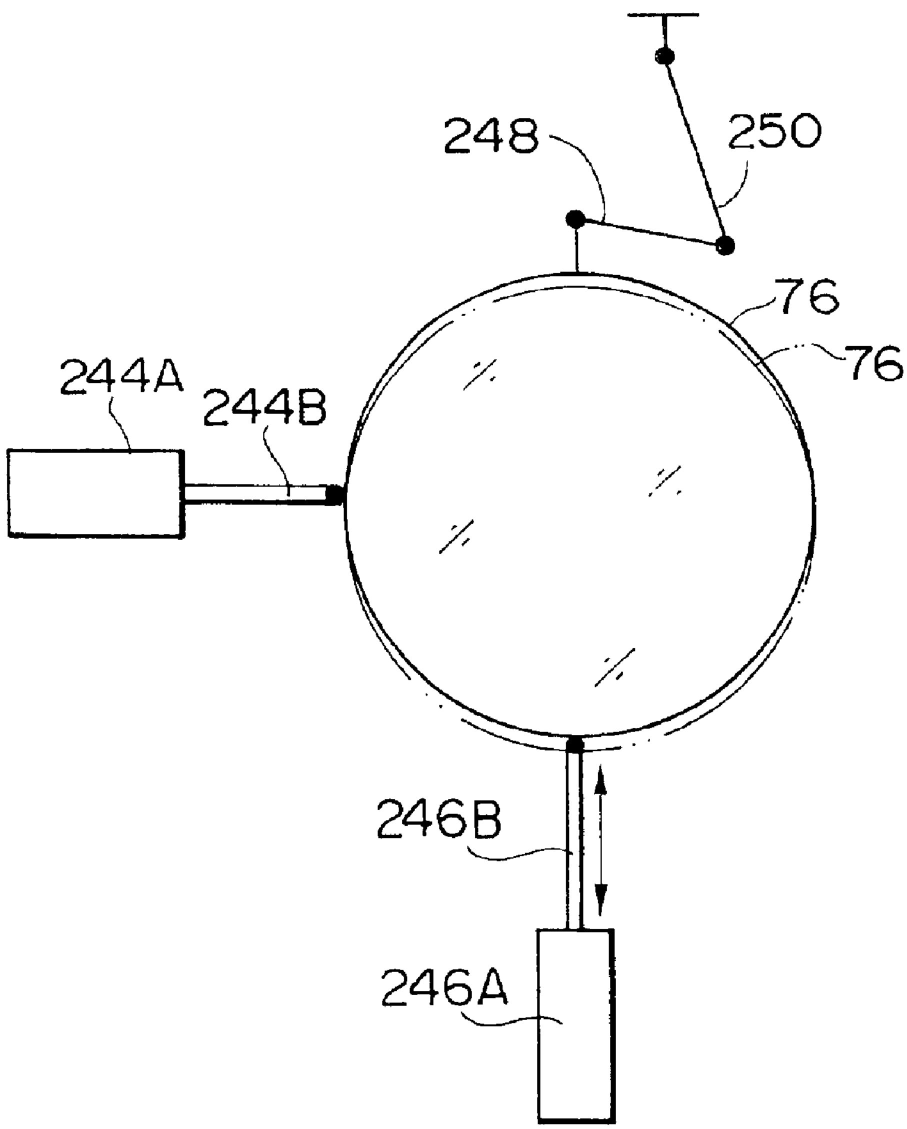
FIG. 17 is an explanatory diagram showing the operation at the time of the movable lens moving in the vertical direction.

When the rod 246B extends and contracts with the driving force of the motor body 246A, as shown in FIG. 17, the movable lens 76 is pushed by the rod 246B, or pulled by the rod 246B to move in the vertical direction in FIG. 17. Moreover, if the force in the lateral direction is applied to the lens frame body 77 in FIG. 15, the roller 266 is guided by the slot 264 and the movable lens 76 moves in the lateral direction in FIG. 15.

The connection frame 268 is fixed to the rod 246B of the linear motor 246. In FIG. 15, the connection frame 268 is arranged in the lateral direction, the rod 246B is fixed to its center section, and the right and left end sections are slidably supported by linear guides 270 and 270 respectively. The linear guides 270 and 270 are provided in parallel with the rod 246B, and when the rod 246B is extended and contracted, the connection frame 268 moves in parallel in the vertical direction with keeping the posture.

The tip of a contact needle 272B for detection of a position sensor 272 is contacted with pressure to the connection frame 268. As for the position sensor 272, a sensor body 272A is fixed to the rear plate 54 at a position where a contact needle 272B for detection becomes parallel to the rod 246B, and the position sensor 272 detects an moving amount of the connection frame 268 which moves in parallel with extending and contracting operation of the rod 246B.

Similarly to the position sensor 260, also in this position sensor 272, the contact needle 272B for detection is not made to directly contact to the periphery of the lens frame body 77, but is made to contact to the connection frame 268 by which the moving amount of the movable lens 76 can be indirectly detected. The connection frame 268 moves in parallel with keeping the posture without relation to the amount of extension and contraction of the rod 246B. Hence, the contact needle 260B for detection neither shifts nor slips from the connection frame 268 during the movement.

A bobbin 274A constitutes a speed generator 274, and a core 274B constitutes a speed generator 274. This core 274B is fixed to the connection frame 268.

In addition, the internal structure of the vibration proof adapter 10 is not limited to the forms shown in FIGS. 15 to 17, but various forms are possible for the concrete structure for suitably moving the movable lens 76 with a drive device such as an actuator.

Figure 18:
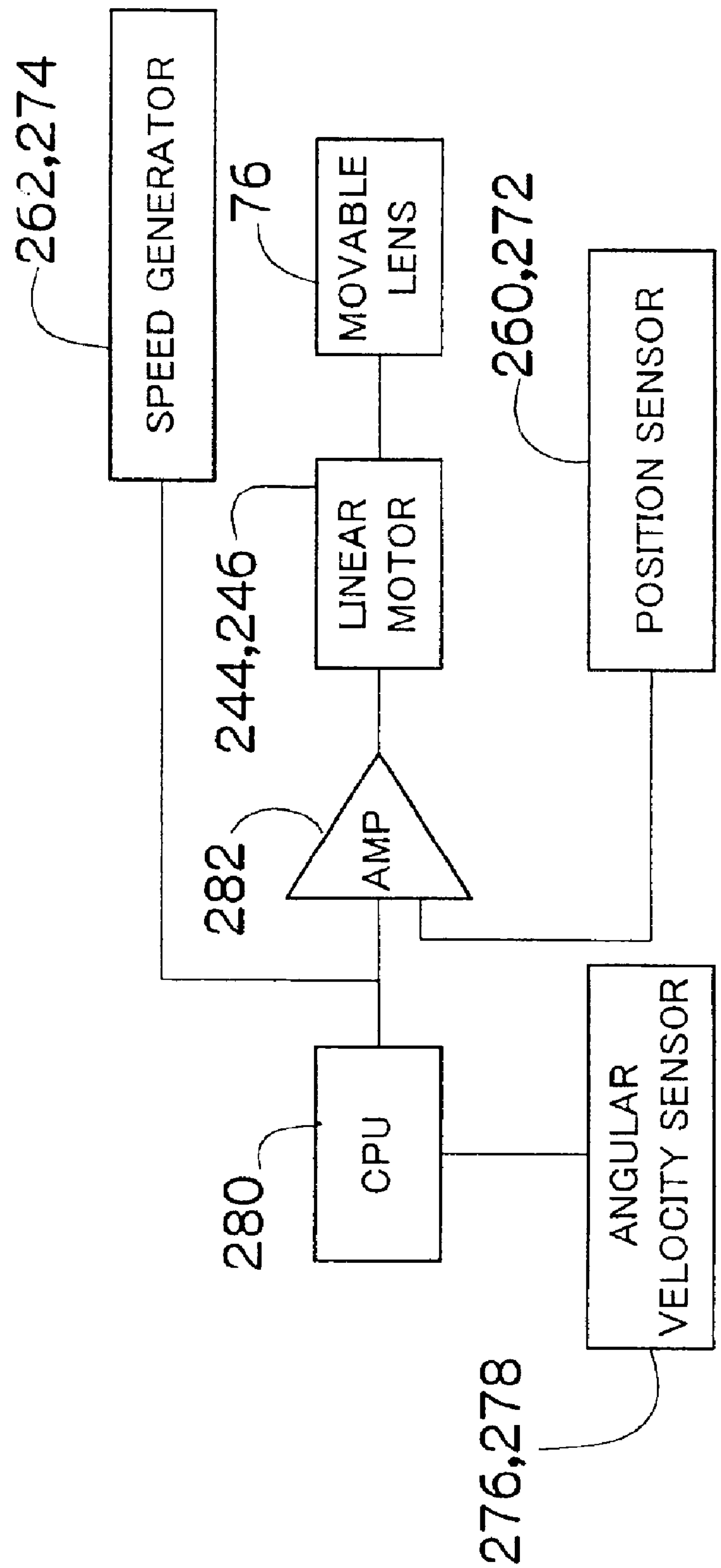
FIG. 18 is a block diagram showing a control system of the vibration proof mechanism shown in FIG. 15.

FIG. 18 is a block diagram showing a drive control system for the movable lens 76. Angular velocity sensors 276 and 278 shown in this drawing are arranged inside the vibration proof adapter 10 (inside the rear plate 54). One angular velocity sensor 276 detects vibration of a lateral component among vibration transmitted to the television camera apparatus 12, and this detected information is supplied to the CPU 280.

The CPU 280 calculates the moving amount for compensation in the lateral direction, which should be given to the movable lens 76, on the basis of the information accepted from the angular velocity sensor 276. After this signal that shows the moving amount for compensation in the lateral direction is amplified by an amplifier 282, it is outputted to the linear motor 244 (refer to FIG. 15). The linear motor 244 operates so that only the amount according to the command signal from the CPU 280 may extend or contract the rod 244B, and moves the movable lens 76 to a position for compensating image blurring. Thereby, the vibration component in the lateral direction is offset by the movement of the movable lens 76, and image blurring in the lateral direction is suppressed.

The position sensor 260 detects the movement position of the connection frame 56 at the time of the movement of the movable lens 76 in the lateral direction. The position signal detected by the position sensor 260 is compared with the signal that shows the moving amount for compensation that is outputted from the CPU 280. Then, the feedback control of the linear motor 244 is performed so that the movable lens 76 may be located in the position corresponding to a moving amount for compensation.

Similarly, another angular velocity sensor 278 detects vibration of a vertical component among vibration transmitted to the television camera apparatus 12, and this detected information is supplied to the CPU 280. The CPU 280 calculates the moving amount for compensation in the vertical direction, which should be given to the movable lens 76, on the basis of the information accepted from the angular velocity sensor 278. This signal that shows the moving amount for compensation in the vertical direction is outputted through the amplifier 282 to the linear motor 246 (refer to FIG. 15). The linear motor 246 operates so that only the amount according to the command signal from the CPU 280 may extend or contract the rod 246B, and moves the movable lens 76 to a position for compensating image blurring. Thereby, the vibration component in the vertical direction is offset by the movement of the movable lens 76, and image blurring in the vertical direction is suppressed.

The position sensor 272 detects the movement position of the connection frame 68 at the time of the movement of the movable lens 276 in the vertical direction. The position signal detected is compared with the signal that shows the moving amount for compensation that is outputted from the CPU 280. Then, the feedback control of the linear motor 246 is performed so that the movable lens 276 may be located in the position corresponding to the moving amount for compensation.

FIG. 19 is a block diagram showing the whole structure of the vibration proof adapter 10. The vibration proof adapter 10 mainly comprises a vibration detection sensor 284, lens information memory 286, a drive circuit 288, a supply power judging circuit 290, the CPU 280, and a lens information setting switch 292. The vibration detection sensor 284 is equivalent to the angular velocity sensors 276 and 278 described in FIG. 18. The drive circuit 288 is a circuit block for driving the movable lens 76, and includes the amplifier 282 and linear motors 244, and 246 described in FIG. 18. The lens information setting switch 292 is equivalent to the DIP switch 102 described in FIG. 6.

The power of the vibration proof adapter 10 can be supplied from an external power supply such as a battery 294, or a camera power supply terminal 295 of the camera body 16. The supply power judging circuit 290 judges a supply source, and automatically switches a power supply source to the power supply terminal 296 inside the vibration proof adapter 10 to any of the battery 294 or the camera power terminal 295.

The lens apparatus 14 has a zoom focal distance information output device 298, an extender information output device 300, and a lens information service device 302. A zoom position (focal distance presently set) of the lens apparatus 14 is always detected by a detection sensor such as a potentiometer not shown, and the focal distance information is reported to the CPU 280 of the vibration proof adapter 10 from the zoom focal distance information output device 298. Moreover, the information (extender information) that shows the status (the existence and the extender magnification of employment of an extender) of the extender of the lens apparatus 14 is reported to the CPU 280 from the extender information output device 300.

The lens information service device 302 provides the vibration proof adapter 10 and the camera body 16 with the model information on the lens apparatus 14 concerned, optical performance specification data (lens specific information containing a lens multiplication), etc., and is implemented in ROM in which, for example, lens specific information is stored. When the vibration proof adapter 10 is connected to the lens apparatus 14, the lens specific information will be transmitted to the CPU 280 of the vibration proof adapter 10 from the lens information service device 302, and the information will be stored by the lens information memory 286. The CPU 280 reads data from the lens information memory 286 if needed, and performs calculation for the control of the movable lens 76.

Moreover, the data corresponding to a plurality of lens models is stored in the lens information memory 286 beforehand. When a user specifies the lens apparatus 14, which is used, with using the lens information configuration switch 292, the CPU 280 can read data required for the control of the corresponding lens apparatus 14 from the lens information memory 286.

A controller (remote operation unit) 310 is connected to the vibration proof adapter 10. The controller 310 has a vibration proof ON/OFF switch 312 for selecting the ON/OFF status of the vibration proof function, a sensitivity setting device 314 for adjusting the sensitivity of the vibration proof function, an indicating device 316 for indicating the ON/OFF status of the vibration proof function, and a switch inverting device 318 for inverting the function of the vibration proof ON/OFF switch 310.

When the vibration proof function is turned on with the vibration proof ON/OFF switch 312, the indicating device 316 of the controller 310 and the indicator 96 of the vibration proof adapter 10 perform the indication which shows that the vibration proof function is in the ON status.

Figure 20:
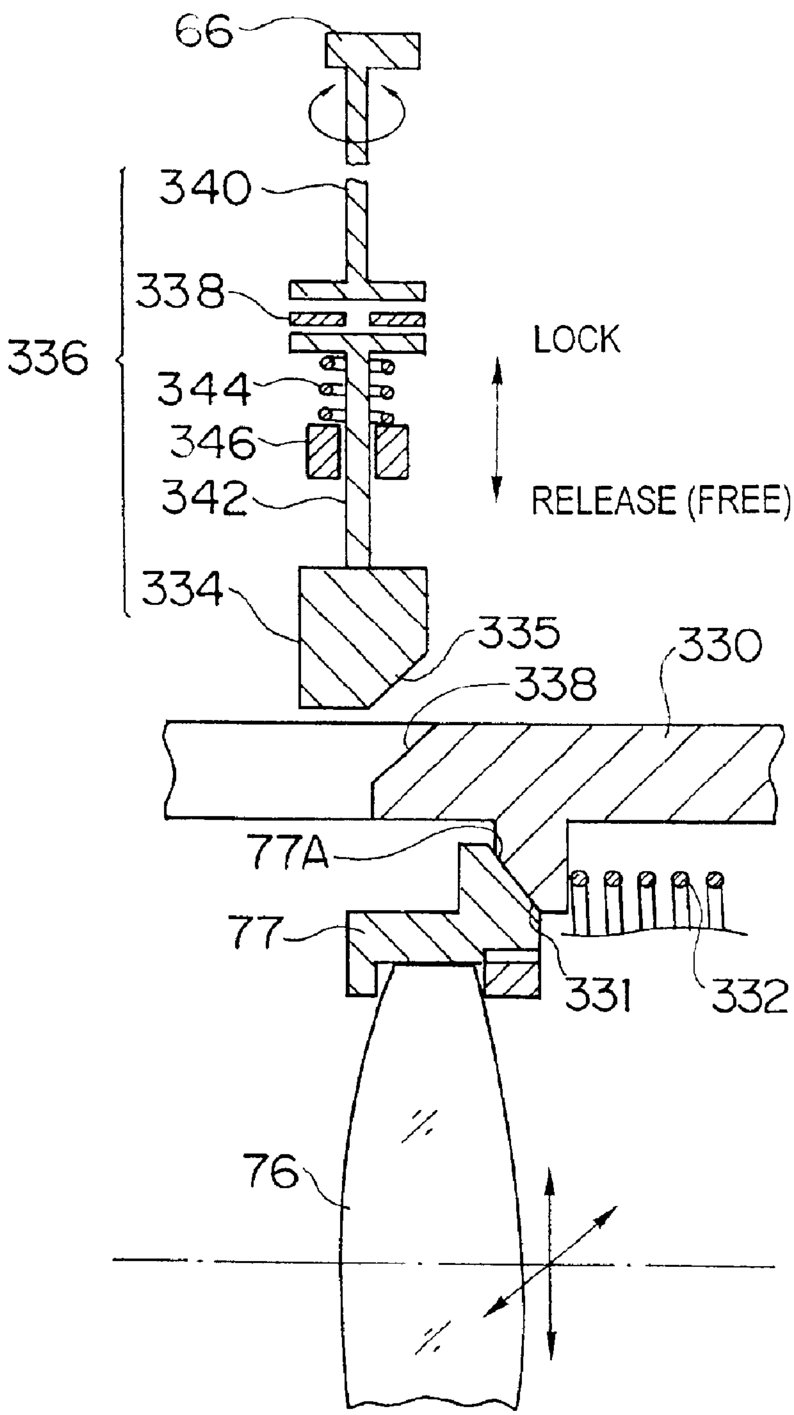
FIG. 20 is a sectional view showing a lock mechanism of a movable lens.

FIG. 20 is a sectional view showing a structural example of a lock mechanism of the vibration proof lens 44. The mechanism for locking the movable lens 76 mainly comprises: a lock ring 330 which presses down the lens frame 77; a compression spring 332 which pushes the lock ring 330 in the direction (left-hand direction in FIG. 20) contacted to the lens frame 77; a tapered member 334 which moves the lock ring 330 in the evacuation direction (right-hand direction in FIG. 20) with opposing to spring force; and a shank 336 transmitting the operating force of the lever 66 to the tapered member 334.

A tapered face 77A (for example, an tilt angle is 45°) is formed in the lens frame 77, and the tapered face 331 whose tilt angle approximately coincides with the taper face 77A of the lens frame 77 is formed in the lock ring 330. When the tapered face 331 of the lock ring 330 is contacted with pressure to the tapered face 77A of the lens frame 77 by an action of the compression spring 332, the movable lens 76 is locked at the origin of the optical axis (home position on design).

A shank 336 has the structure where the first shank 340 and the second shank 342 are connected through the slide clutch 338. The lever 66 is fixed to the upper end of the upper first shank 340 in FIG. 20, and the tapered member 334 is fixed to the lower end of the second shank 342. The second shank 342 is pushed by the spring 344 upward in FIG. 20. A spring-holding member 346 supports a basis of the spring 344, and is fixed to the rear plate 54 (not shown in FIG. 20).

With using the lever 66, pushing operation in the axial direction and rotational operation with centering the axis can be performed. When the lever 66 is pushed, the taper member 334 moves downward in FIG. 20. The lock ring 330 has a tapered face 338 whose tilt angle (for example, a tilt angle is 45°) is approximately equal to that of the tapered face 335 of the tapered member 334. When the lever 66 is pushed in the axial direction (the vertical direction in FIG. 20), the tapered member 334 moves by the operating force downward in FIG. 20. Then, the tapered face 335 pushes the tapered face 338 of the lock ring 330, and the lock ring 330 moves rightward in FIG. 20 with resisting to the spring force of the compression spring 332.

In this way, the lock ring 330 separates from the lens frame 77, and the movable lens 76 will be in the status (lock release status) that can move. If the rotational operation of the lever 66 is performed in this lock release status to be turned to a "lock release position", the first shank 340 is locked by a latch mechanism not shown. Then, the motion of the shank 63 in the axial direction is regulated (fixed), and a lock release status is kept.

When the lever 66 is turned to a "lock position", the latch of the above-described latch mechanism is canceled and the tapered member 334 is put back upward in FIG. 20 by the force of the spring 344. At this time, according to the pushing force of the compression spring 332, the lock ring 330 moves leftward in FIG. 20, and locks the movable lens 76.

In the vibration proof adapter 10 of this example, the vibration proof mechanism described in FIG. 15 and the lock mechanism described in FIG. 20 are installed to the rear plate 54 that constitutes the body housing 30. Hence, the maintenance work of the vibration proof mechanism becomes possible by removing the front plate 32.

Figure 21:
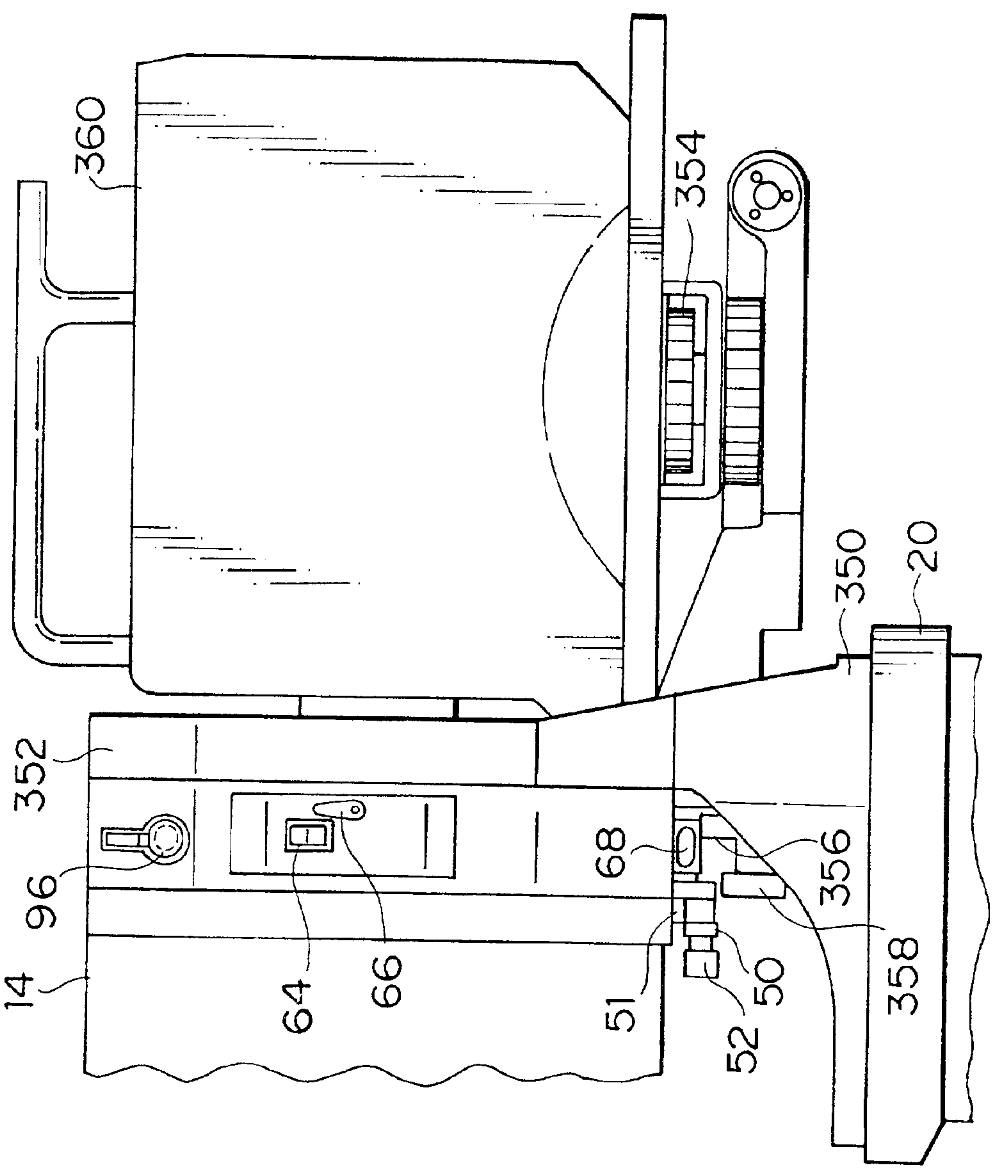
FIG. 21 is a side view showing an aspect of connecting a camera and a vibration proof adapter with using a lens supporter.

The vibration proof adapter 10 is directly connected between the lens apparatus 14 and camera body 16 in the above-described embodiment. Nevertheless, as shown in FIG. 21, depending on the model of a camera to be used, a lens supporter 350 is used.

In this case, the connection structure of the lens apparatus 14 and the vibration proof adapter 10 is as described in FIGS. 3 to 5, and the rear face of the vibration proof adapter 10 is s connected to a mount frame 352 of the lens supporter 350. Although not shown about the detail of the mount frame 352, a connecting device (the same ones as the hook 41 and cavity 62) similar to the front face of the camera body 16 described in FIG. 5 and a connector similar to the connector 172 described in FIG. 14 are provided in the left-hand side of the mount frame 352 in FIG. 21.

The camera (ENG camera in this case) 360 is arranged behind the mount frame 352 of the lens supporter 350 (the right-hand side of the mount frame 352 in FIG. 21), and the lens mount 55 of the vibration proof adapter 10 is connected to the camera 360 with sandwiching the mount frame 352. A height control knob 354 in FIG. 21 is used for adjusting the height of the camera 360.

Figure 22:
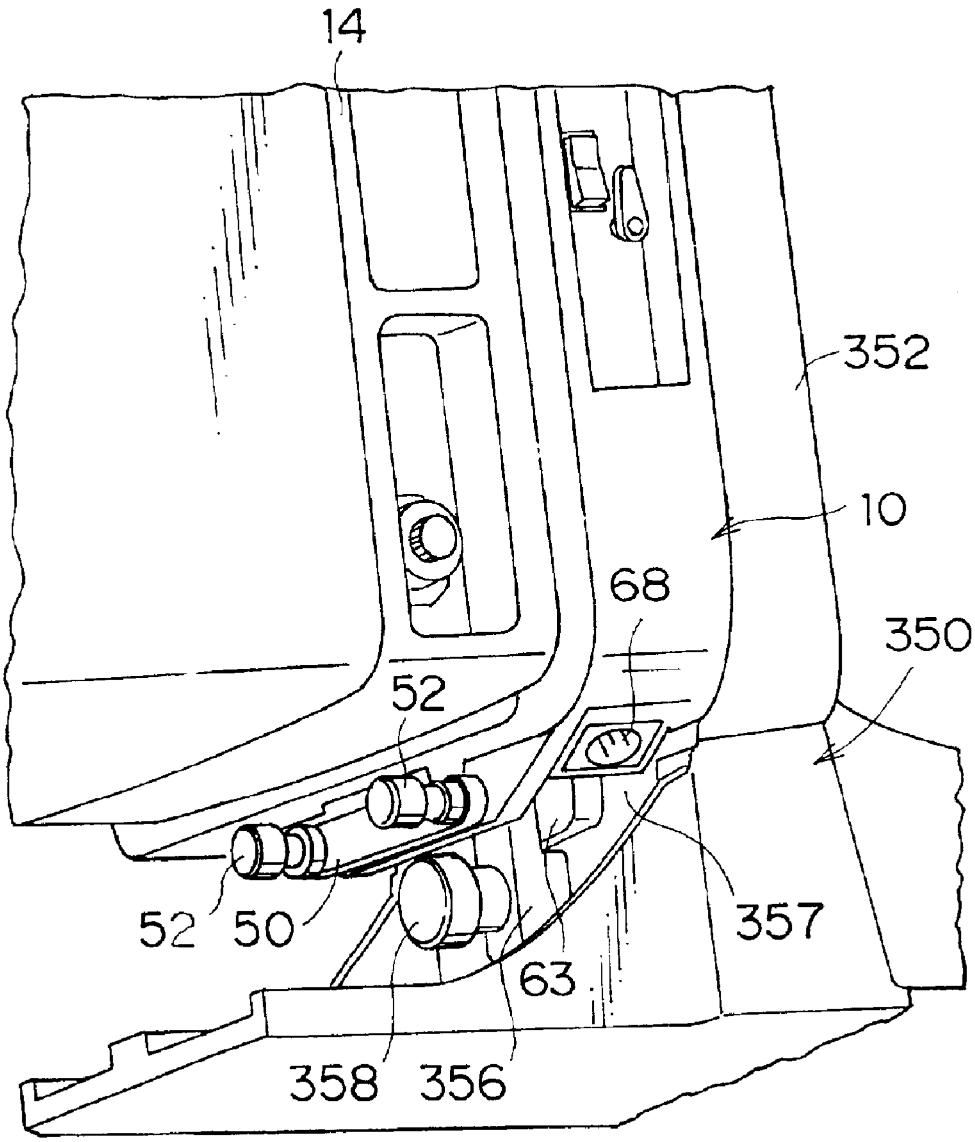
FIG. 22 is a perspective view showing the structure of fixing a supporting plate, which is a lower part of a vibration proof adapter, to a lens supporter.

Moreover, the lens supporter 350 has a sandwich pressure member 356 (the same one as the sandwich pressure plate 17 described in FIG. 1) that fixes the supporting plate 63 of the vibration proof adapter 10. As shown in FIG. 22, the supporting plate 63 is held in the sandwich pressure status by sandwiching the supporting plate 63 between a front standing face 357 of the lens supporter 350 and the sandwich pressure member 356 and fastening a clamp screw 358.

As mentioned above, the optical shift type vibration proof adapter that can maintain the high image quality also corresponding to an HD lens is realizable by applying the present invention. Hence, image blurring by a wind at the time of an outdoor sport broadcast or the vibration of footing can be reduced.

As described above, according to the vibration proof adapter 10 of this embodiment, the same hook 40 (lens connection) and hook 56 (camera connection) as hooks 57 and 41 for connecting the lens apparatus 14 and a camera body 16 are provided in the front plate 32 and rear plate 54 of the vibration proof adapter 10. Hence, the vibration proof adapter 10 is directly connectable between the lens apparatus 14 and camera bodies 16.

Moreover, the hook 40 in the front face of the vibration proof adapter 10 is common with the hook 41 in the front ace of the camera body 16, and the hook 56 in the rear face of the vibration proof adapter 10 is common with the hook 57 in the rear face of the lens apparatus 14. Hence, it is not necessary to separately add dedicated connecting means, a mechanism is also easy, and connecting work is also easy.

Furthermore, the handle 90 is provided in the upper face or side face of the periphery of the vibration proof adapter 10. Hence, at the time of the attaching and detaching work of the vibration proof adapter 10, an operator can hold the handle 90 and can deal with the vibration proof adapter 10. Therefore, workability improves.

Furthermore, this embodiment has the structure that the cavity 3 8 which is a run off of the bayonet mount 15 is formed in the front plate of the vibration proof adapter 10, and the bayonet mount 15 of the lens apparatus 14 is contained in the cavity 38 at the time of connecting the lens apparatus 14 to closely contact the rear face of the lens apparatus 14 with the front plate 32 of the vibration proof adapter 10. Hence, it is possible to achieve thinning of the vibration proof adapter 10 and the miniaturization of the television camera apparatus 12.

In this embodiment, the vibration proof adapter 10 is connected to the camera body 16, but if connecting the vibration proof adapter 10 to the lens supporter, the connection structure described in the embodiment can be also applied to the lens supporter. Moreover, the lens apparatus to which the present invention is applied is not limited to the EFP lens apparatus 14, but can be also applied to various lenses such as an HD lens.

As described above, in the vibration proof adapter according to the present invention, the indicating device for indicating the ON/OFF status of a vibration proof function is provided in the position where a cameraperson can check an indication status with looking at a view finder on the periphery of the vibration proof adapter. Hence, the cameraperson can grasp the ON/OFF status of the vibration proof function with operating the camera.

As described above, in the vibration proof adapter according to the present invention, openings for subject light passing are formed in the front face and rear face of a body housing where a movable lens is contained, the first lens and second lens are attached to each opening to seal the interior of the body housing. Hence, the adhesion of dust to a movable lens can be prevented and the performance of a high performance lens can be kept. Moreover, the transparent glass etc. for sealing can be omitted and thinning of a vibration proof adapter can be achieved.

As described above, since a vibration proof adapter according to the present invention has a lens connection in a front face and a camera connection on a rear face, which are the same as the structure for connecting a lens apparatus and a camera, it is possible to directly connect the vibration proof adapter between the lens apparatus and camera.

Since the connection structure is commonized, it is not necessary to separately add dedicated connection means, and hence, the structure is not complicated and the connection work is easy.

Furthermore, a handle is provided in the upper face or side face of the periphery of a vibration proof adapter. Hence, at the time of the attaching and detaching work of the vibration proof adapter, an operator can hold the handle and can deal with the vibration proof adapter. Therefore, workability improves.

Furthermore, the present invention has the structure that a run off of the bayonet mount is formed in a front plate of a vibration proof adapter of the present invention, and the bayonet mount of a lens apparatus is contained in the run off at the time of connecting the vibration proof adapter to closely contact the rear face of the lens apparatus with the front plate of the vibration proof adapter. Thus, it becomes possible to achieve the thinning of a vibration proof adapter and the miniaturization of a television camera apparatus.

As described above, in the vibration proof adapter according to the present invention, since control units are arranged on the peripheral side face of the vibration proof adapter arranged between a lens and a camera, an operator can perform various types of operation regarding the vibration proof adapter in attaching the adapter. In particular, owing to providing a cavity in a peripheral side face and arranging a control unit in the cavity, it becomes possible to obtain a form that the vibration proof adapter seems to have an identification with the lens and camera in a attaching status, and that can protect the control unit.

In addition, an optical shift type vibration proof adapter that can maintain the high image quality also corresponding to an HD lens is realizable by applying the present invention. Hence, image blurring by a wind at the time of an outdoor sport broadcast or the vibration of footing can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A vibration proof adapter that is arranged between a camera and one of a lens and a lens supporter, comprising:

an indicating device which indicates an ON/OFF status of a vibration proof function by the vibration proof adapter concerned, the indicating device being provided on a periphery of the vibration proof adapter, wherein the indicating device enables a cameraperson to check an indication status with looking at a view finder in a usual operation posture from a rear of the view finder installed in an upper part of the camera.

2. The vibration proof adapter according to claim 1, wherein the indicating device is provided near one of an upper right corner and an upper left corner of the vibration proof adapter.

3. The vibration proof adapter according to claim 1, wherein the indicating device is constituted so that an indication status cannot be checked from a subject side to which the lens is directed.

4. The vibration proof adapter according to claim 1, wherein:

a cavity that contains the indicating device is formed in a peripheral side face of the vibration proof adapter, and the indicating device is constituted to be retractable in the cavity.

5. A vibration proof adapter that is arranged between a lens apparatus and a camera, comprising a body housing with:

a front plate constituting the front face;

a rear plate constituting the rear face; and a frame section that is unitedly provided on one of the front plate and the rear plate in one piece, the frame section constituting the periphery of the body housing, wherein:

sections other than the openings are attached in sealed conditions;

the first lens is attached on the front plate; and the second lens is attached on the rear plate, and wherein:

a movable lens is contained in an interior of a body housing which is used as an exterior of the vibration proof adapter, the movable lens being moved so that image blurring generated by vibration added to the camera is corrected;

openings are formed along an optical axis of the movable lens on a front face and a rear face of the body housing in order to pass light from a subject which enters through the lens apparatus, the front face facing the lens apparatus, the rear face facing the camera; and a first lens is attached to the opening formed in the front face and a second lens is attached to the opening formed in the rear face, so that the interior of the body housing is sealed.

6. A vibration proof adapter that is installed between a camera and a lens apparatus, wherein:

a lens connection similar to a lens connection structure formed in the camera is formed in a front face of the vibration proof adapter to which the lens apparatus is connected;

a camera connection similar to a camera connection structure formed in the lens apparatus on a rear face of the vibration proof adapter to which the camera is connected is formed; and a handle is attached on one of an upper face and a side face of a periphery of the vibration proof adapter.

7. The vibration proof adapter according to claim 6, wherein the lens connection and the camera connection are formed with hooks, hooking the lens apparatus and the camera, respectively.

8. The vibration proof adapter according to claim 6, wherein a run off is formed for a bayonet mount of the lens apparatus in the front face of the vibration proof adapter to which the lens apparatus is connected.

9. A vibration proof adapter that is installed between a camera and a lens, wherein a control unit for operating the vibration proof adapter is formed on a peripheral side face of the vibration proof adapter, said control unit including at least one among a power ON/OFF switch, a lock knob fixing a vibration proof lens, a DIP switch for performing a magnification setup of a lens to be used, a DIP switch for setting up a vibration proof control mode about pan/tilt operation, and a test mode switch for testing a status of the vibration proof adapter on predetermined conditions.

10. The vibration proof adapter according to claim 9, wherein the control unit is provided in a cavity of the peripheral side face lest the control unit should project from the peripheral side face of the vibration proof adapter.

11. The vibration proof adapter according to claim 9, wherein:

setting of the DIP switch is performed through an opening provided in the peripheral side face;

the opening in the peripheral side face is composed of a first opening and a second opening;

the first opening is covered with a first lid section fixed with screws; and the second opening is covered with a second lid section that is easily detachable without tools.

12. The vibration proof adapter according to claim 11, wherein:

the DIP switch performing magnification setup of the lens is operated through the second opening; and the DIP switch for setting the vibration proof control mode about the pan/tilt operation is operated through the first opening.

13. The vibration proof adapter according to claim 9, wherein unless the lock knob is changed into a lock status, the power ON/OFF switch is not operated.

* * * * *